(12) United States Patent
Shigeta

(10) Patent No.: US 9,395,513 B2
(45) Date of Patent: Jul. 19, 2016

(54) LENS SYSTEM HAVING A MOVABLE OPTICAL MEMBER THAT IS CONTROLLABLE ACCORDING TO A PREDETERMINED COMMAND VALUE, IMAGE PICKUP SYSTEM, AND DRIVE CONTROL METHOD FOR THE LENS SYSTEM

(71) Applicant: CANON KABUSHIKI KAISHA, Tokyo (JP)

(72) Inventor: Junji Shigeta, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 90 days.

(21) Appl. No.: 13/909,192

(22) Filed: Jun. 4, 2013

(65) Prior Publication Data
US 2013/0329119 A1    Dec. 12, 2013

(30) Foreign Application Priority Data
Jun. 8, 2012    (JP) .................................. 2012-130583

(51) Int. Cl.
*H04N 5/232* (2006.01)
*G03B 13/00* (2006.01)
*G02B 7/09* (2006.01)

(52) U.S. Cl.
CPC .................. *G02B 7/09* (2013.01); *H04N 5/232* (2013.01); *H04N 5/23203* (2013.01)

(58) Field of Classification Search
CPC ........................... H04N 5/232; H04N 5/23203

USPC .................................................. 348/345, 360
See application file for complete search history.

(56) References Cited

U.S. PATENT DOCUMENTS

| 8,154,652 | B2 | 4/2012 | Tanaka | |
|---|---|---|---|---|
| 2010/0053422 | A1* | 3/2010 | Tanaka | .......................... 348/373 |

FOREIGN PATENT DOCUMENTS

| JP | H11338030 A | 12/1999 |
|---|---|---|
| JP | 2005-328496 A | 11/2005 |
| JP | 2006-121417 A | 5/2006 |
| JP | 2008-310093 A | 12/2008 |

OTHER PUBLICATIONS

Office Action issued in Japanese Appln. No. 2012-130583 mailed Mar. 29, 2016. English machine translation provided.

* cited by examiner

*Primary Examiner* — Antoinette Spinks
(74) *Attorney, Agent, or Firm* — Rossi, Kimms & McDowell LLP

(57) ABSTRACT

Provided is a lens system, including: a lens apparatus including a movable optical member; a command apparatus for generating a command signal to be transmitted to the movable optical member; and a signal converter connected to the command apparatus by wire and communicable to and from the lens apparatus by wireless, in which: the lens apparatus includes: a drive controller for controlling drive of the movable optical member based on the command signal; and a wireless communicator for performing wireless communication to and from the signal converter; and after the wireless communication between the wireless communicator and the signal converter is stopped, the drive controller drives and controls the movable optical member in accordance with a situation in which the wireless communication is stopped.

10 Claims, 19 Drawing Sheets

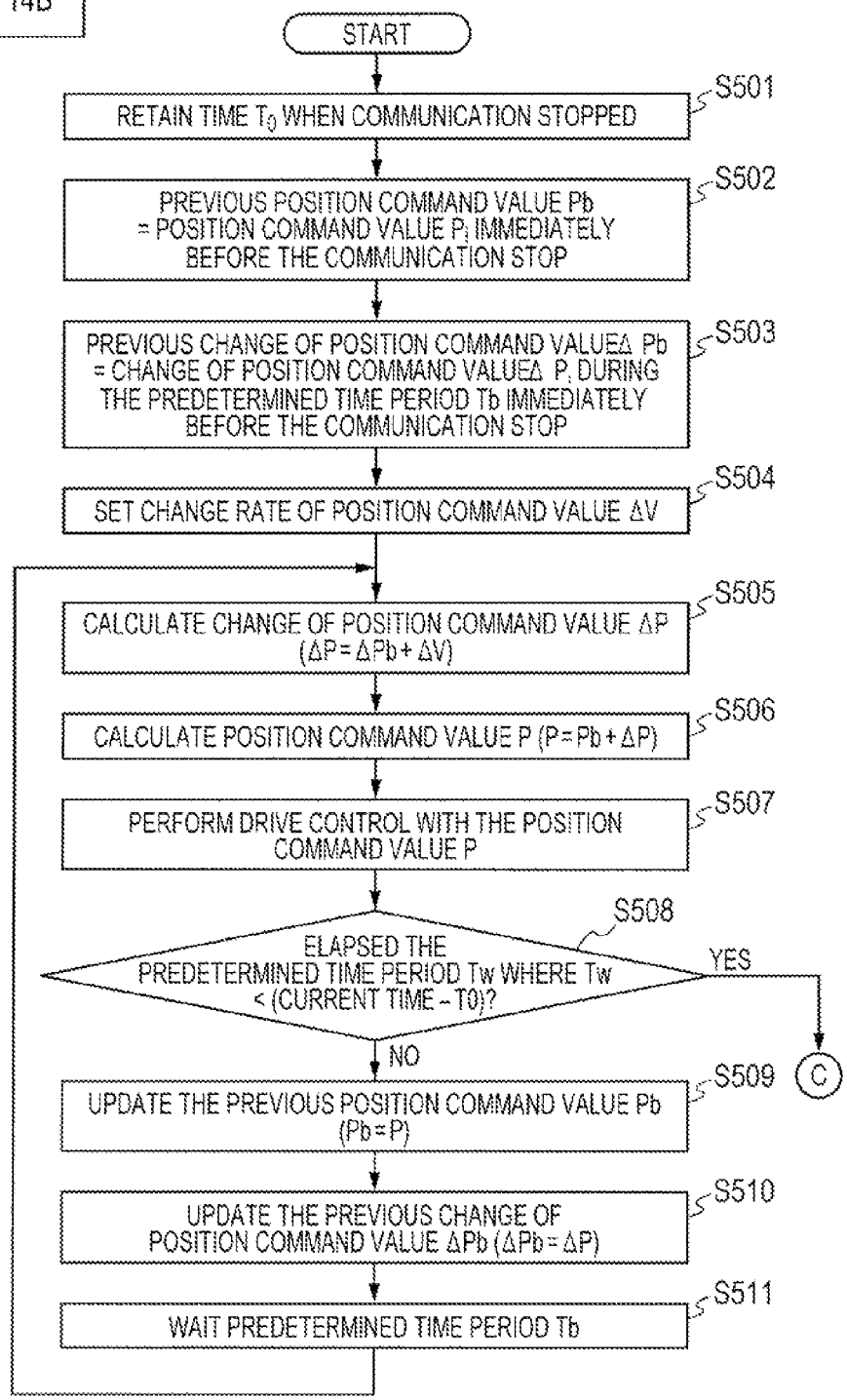

LENS SYSTEM HAVING A MOVABLE OPTICAL MEMBER THAT IS CONTROLLABLE ACCORDING TO A PREDETERMINED COMMAND VALUE, IMAGE PICKUP SYSTEM, AND DRIVE CONTROL METHOD FOR THE LENS SYSTEM

BACKGROUND OF THE INVENTION

1. Field of the Invention

The present invention relates to a lens system, an image pickup system, and a drive control method for the lens system, which are configured to control drive of movable optical members including a zoom lens, focus lens, and iris by a command apparatus. In particular, the present invention relates to a lens system, an image pickup system, and a drive control method for the lens system, which are used for television broadcast.

2. Description of the Related Art

Japanese Patent Application Laid-Open No. 2005-328496 describes a conventional control system for movable optical members including a zoom lens and focus lens in a television lens. In the system configuration, a zoom demand as a command apparatus for outputting a command signal for zoom drive and a focus demand as a command apparatus for outputting a command signal for focus drive are connected to a lens body. In addition, as command apparatus that can be connected to the lens body, there are multiple command apparatus including a command apparatus for outputting a stop command, and a command apparatus for controlling an image stabilization optical system.

In addition, the lens body and the command apparatus are connected through cable connection using connectors. The connector described in Japanese Patent Application Laid-Open No. 2005-328496 has a 20-pin structure, and a 20-conductor cable having as many conductors as the number of pins is used for connecting the lens body to the command apparatus. In addition, a cable of approximately 1 m is normally prepared as the cable between the lens body and the command apparatus in order to operate beside the lens body.

FIG. 19 is a block diagram illustrating the conventional television image pickup system described above. A zoom demand 3 for operating a zoom lens of a lens body 2 connected to a camera body 1 can generate a return switch command, a VTR switch command, a shot command, and a shot memory command in addition to a zoom command for zoom drive control. A focus demand 4 for operating a focus lens of the lens body 2 can generate the same switch commands as those in the zoom demand 3 in addition to a focus command for focus drive control. The lens body 2 is connected to the zoom demand 3 and the focus demand 4 by using cables 5 and 6, which are approximately 20-conductor cables normally prepared with a length of approximately 1 m and connecters 7 and 8, respectively.

In the above-mentioned structure, the lens body and each command apparatus are connected via a multi-conductor cable having a length of approximately 1 m. In addition, when connecting multiple command apparatus, it is necessary to use the same number of cables as the multiple command apparatus. Therefore, the following problem arises in a photography site of a broadcasting station.

There may be crane photography in which a camera and a lens are provided to the tip end of a crane whose length is approximately 3 to 5 meters and command apparatus are operated for photographing by a camera operator at the base of the crane. There may also be photographing of savage animals at a distance from a camera and a lens which are installed in nature. In such cases, the length of the normal cable provided between the lens body and the command apparatus is insufficient, and hence it is necessary to manufacture and install a dedicated extension cable. Therefore, the manufacturing and installation of the dedicated extension cable require cost and time. Cables each including as many as approximately long conductors are installed to correspond to the number of command apparatus, which leads to a problem in that reliability is degraded because there is a risk of damages to conductors and cables when the cables are installed.

Therefore, in order to solve this problem, for example, Japanese Patent Application Laid-Open No. 2008-310093 discloses an optical apparatus that can be easily installed without degrading reliability even in a photography in which the lens body and the command apparatus are distant from each other, by using wireless connection between the lens body and the command apparatus. In addition, Japanese Patent Application Laid-Open No. 2005-328496 discloses the invention that can maintain and improve reliability of wireless data communication even in the case where radio interference or directivity effect occurs due to the use of wireless connection.

However, in the above-mentioned conventional technology disclosed in Japanese Patent Application Laid-Open No. 2008-310093, there is no description about how to deal with a command value after wireless communication is disconnected. Therefore, in the case of a lens apparatus in which the command value is returned to a value at an initial position after the wireless communication is disconnected, the lens is driven to the initial position that is different from the position indicated by the command value so far, and due to this movement of the lens, an unnatural image with a feeling of strangeness is taken.

SUMMARY OF THE INVENTION

Therefore, the present invention provides an optical apparatus that can be easily installed even in photography in which a lens body and a command apparatus are distant from each other, and is capable of taking a natural image without a feeling of strangeness even when there occurs a communication stop that is not intended by a photographer between the lens body and the command apparatus.

According to an exemplary embodiment of the present invention, there is provided a lens system, including: a lens apparatus including a movable optical member; a command apparatus for generating a command signal to be transmitted to the movable optical member; and a signal converter connected to the command apparatus by wire and communicable to and from the lens apparatus by wireless, in which: the lens apparatus includes: a drive controller for controlling drive of the movable optical member based on the command signal; and a wireless communicator for performing wireless communication to and from the signal converter; and after the wireless communication between the wireless communicator and the signal converter is stopped, the drive controller drives and controls the movable optical member in accordance with a situation in which the wireless communication is stopped.

According to the exemplary embodiment of the present invention, it is possible to provide the optical apparatus that can be easily installed even in photography in which the lens body and the command apparatus are distant from each other, and is capable of taking a natural image without a feeling of strangeness even when there occurs the communication stop that is not intended by the photographer between the lens body and the command apparatus.

Further features of the present invention will become apparent from the following description of exemplary embodiments with reference to the attached drawings.

DESCRIPTION OF THE EMBODIMENTS

Now, a lens system of an exemplary embodiment of the present invention is described in detail with reference to the attached drawings.

First Embodiment

Figure 1:
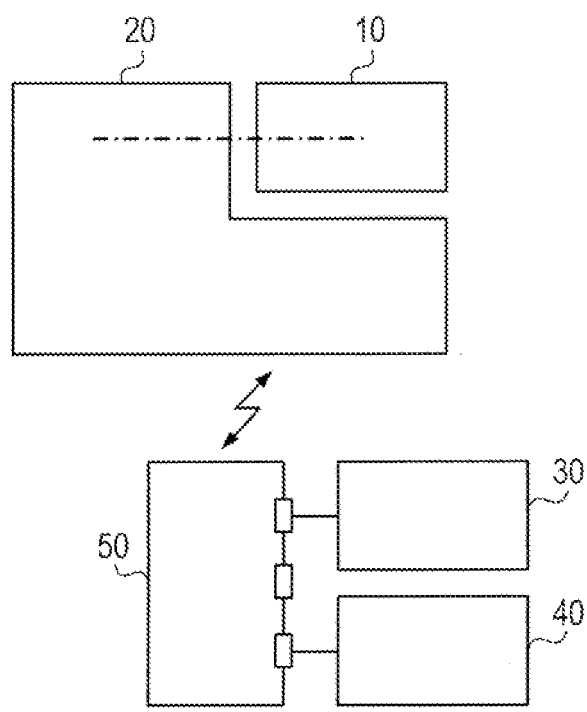
FIG. 1 is a block diagram of a first embodiment of the present invention.

Referring to FIG. 1, a lens system according to a first embodiment of the present invention is described below.

FIG. 1 is a general schematic block diagram of an image pickup system including the lens system of the first embodiment of the present invention. The image pickup system includes a lens body 20, a camera body 10 (image pickup apparatus) to which the lens body 20 is mounted, which includes an image pickup element for taking an object image formed by the lens body 20, and a signal converter 50 connected to a zoom demand 30 and a focus demand 40, both serving as command apparatus operated by operator, via cables as wired connection. The lens body 20 communicates to/from the signal converter 50 by wireless connection.

Figure 2:
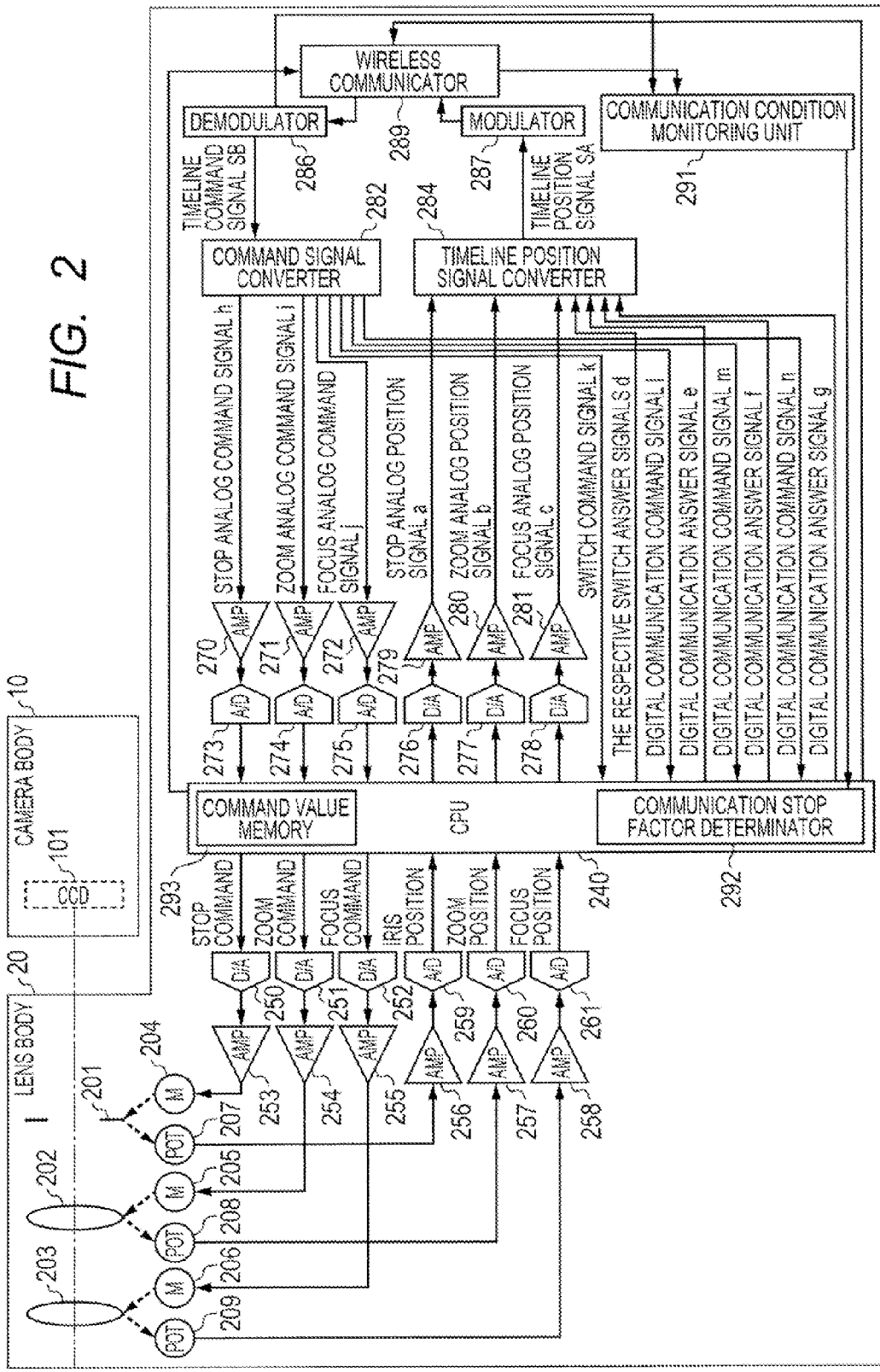
FIG. 2 is a circuit block diagram of a camera body and a lens body.

FIG. 2 is a circuit block diagram of the camera body 10 and the lens body 20. The camera body 10 is equipped with an image pickup element 101 constituted of a CCD.

(Structure of Lens Body)

In the lens body 20 (lens apparatus), a stop 201, a zoom lens 202, and a focus lens 203, which are movable optical members, are arranged on an optical axis of the image pickup element 101.

A stop potentiometer 207, a zoom potentiometer 208, and a focus potentiometer 209 are respectively disposed to detect the respective positions of the stop 201, the zoom lens 202, and the focus lens 203. Further, there are disposed a stop motor 204 for driving the stop 201, a zoom motor 205 for driving the zoom lens 202 in an optical axis direction, and a focus motor 206 for driving the focus lens 203 in the optical axis direction. Outputs of the stop potentiometer 207, the zoom potentiometer 208, and the focus potentiometer 209 are supplied to a CPU 240 via amplifiers 256, 257, and 258 and A/D converters 259, 260, and 261, respectively. In addition, the CPU 240 outputs control signals for respectively driving and controlling the stop motor 204, the zoom motor 205, and the focus motor 206 via D/A converters 250, 251, and 252 and amplifiers 253, 254, and 255.

Further, outputs of the CPU 240 become a stop analog position signal a, a zoom analog position signal b, and a focus analog position signal c (hereinafter referred to also as stop, zoom, and focus analog position signals a, b, and c) and are connected to a timeline position signal converter 284 via D/A converters 276, 277, and 278 and amplifiers 279, 280, and 281, respectively.

The timeline position signal converter 284 is connected to switch answer signals d and digital communication answer signals e, f, and g from the CPU 240. Further, a timeline position signal SA as an output of the timeline position signal converter 284 is delivered to a wireless communicator 289 via a modulator 287.

On the other hand, a timeline command signal SB as a signal from the signal converter 50 after received and output by the wireless communicator 289 is delivered to a command signal converter 282 via a demodulator 286. A stop analog command signal h, a zoom analog command signal i, and a focus analog command signal j (hereinafter referred to also as stop, zoom, and focus analog command signals h, i, and j) as outputs of the command signal converter 282 are supplied to the CPU 240 via amplifiers 270, 271, and 272 and A/D converters 273, 274, and 275, respectively.

In addition, the command signal converter 282 delivers to the CPU 240 switch command signals k and digital communication command signals l, m, and n. Further, an output of the wireless communicator 289 is supplied to a communication stop factor determinator 292 in the CPU 240 via a communication condition monitoring unit 291. Further, the CPU 240 includes a command value memory 293 for storing a command value from the signal converter 50.

In the lens body 20, the D/A converters 250, 251, and 252 convert stop, zoom, and focus analog drive commands as digital data from the CPU 240 into analog data. The amplifiers 253, 254, and 255 power-amplify analog drive signals from the D/A converters 250, 251, and 252 to drive the stop motor 204, the zoom motor 205, and the focus motor 206, thereby operating the stop 201, the zoom lens 202, and the focus lens 203, respectively.

The amplifiers 256, 257, and 258 amplify signals from the stop potentiometer 207, the zoom potentiometer 208, and the focus potentiometer 209, respectively. The A/D converters 259, 260, and 261 convert analog voltages of the stop potentiometer 207, the zoom potentiometer 208, and the focus potentiometer 209 that are input via the amplifiers 256, 257, and 258 into digital values, respectively. The CPU 240 reads the converted digital values as a stop position, a zoom lens position, and a focus lens position, respectively. Encoders may be used as position detectors in place of the stop potentiometer 207, the zoom potentiometer 208, and the focus potentiometer 209, respectively.

The wireless communicator 289 receives wireless data transmitted from the signal converter 50 described later and transmits by wireless the modulated data to be transmitted from the lens body 20 to the signal converter 50. The demodulator 286 demodulates the modulated data received by the wireless communicator 289 so as to generate the timeline command signal SB. The command signal converter 282 divides a series of timeline command signals SB from the demodulator 286 into the stop, zoom, and focus analog command signals h, i, and j, switch command signals k, and the digital communication command signals l, m, and n.

The amplifiers 270, 271, and 272 amplify and match the stop, zoom, and focus analog command signals h, i and j divided by the command signal converter 282, respectively. The A/D converters 273, 274, and 275 supply the command signals h, i, and j from the amplifiers 270, 271, and 272 to the CPU 240, respectively.

In addition, the D/A converters 276, 277, and 278, and the amplifiers 279, 280, and 281 generate the stop, zoom, and focus analog position signals a, b, and c to be sent from the CPU 240 to the zoom demand 30 and the focus demand 40, respectively.

The timeline position signal converter 284 converts these analog position signals a, b, and c into the timeline position signal SA. Other than that, the timeline position signal converter 284 reads each switch answer signal d and the digital communication answer signals e, f, and g from the CPU 240 and converts the read signals into a series of timeline position signals SA.

The modulator 287 modulates the timeline position signal SA from the timeline position signal converter 284 and sends the modulated timeline position signal SA to the wireless communicator 289 in the subsequent stage. The communication condition monitoring unit 291 is a unit for monitoring a wireless communication condition of the wireless communicator 289 and includes, for example, a unit for detecting a radio field intensity in the wireless communication. The communication stop factor determinator 292 determines an index indicating the wireless communication condition from the communication condition monitoring unit 291 and determines a factor of the communication disconnection state (communication stop). A method of determining the communication stop factor is described later. The command value memory 293 stores a part or a whole of the command signals h to n.

The CPU 240 receives the stop, zoom, and focus analog command signals h, i, and j from the command signal converter 282 via the amplifiers 270, 271, and 272, and the A/D converters 273, 274, and 275. In addition, the CPU 240 receives the digital communication command signals l, m, and n. The CPU 240 performs calculation based on the received stop, zoom, and focus command signals h, i, and j and stop, zoom, and focus positions received from the individual potentiometers 207, 208, and 209 so as to output command signals for driving and controlling the motors 204, 205, and 206.

In addition, the CPU 240 outputs information for designating a communication target to the wireless communicator 289.

(Structures of Zoom Demand and Focus Demand)

Figure 3:
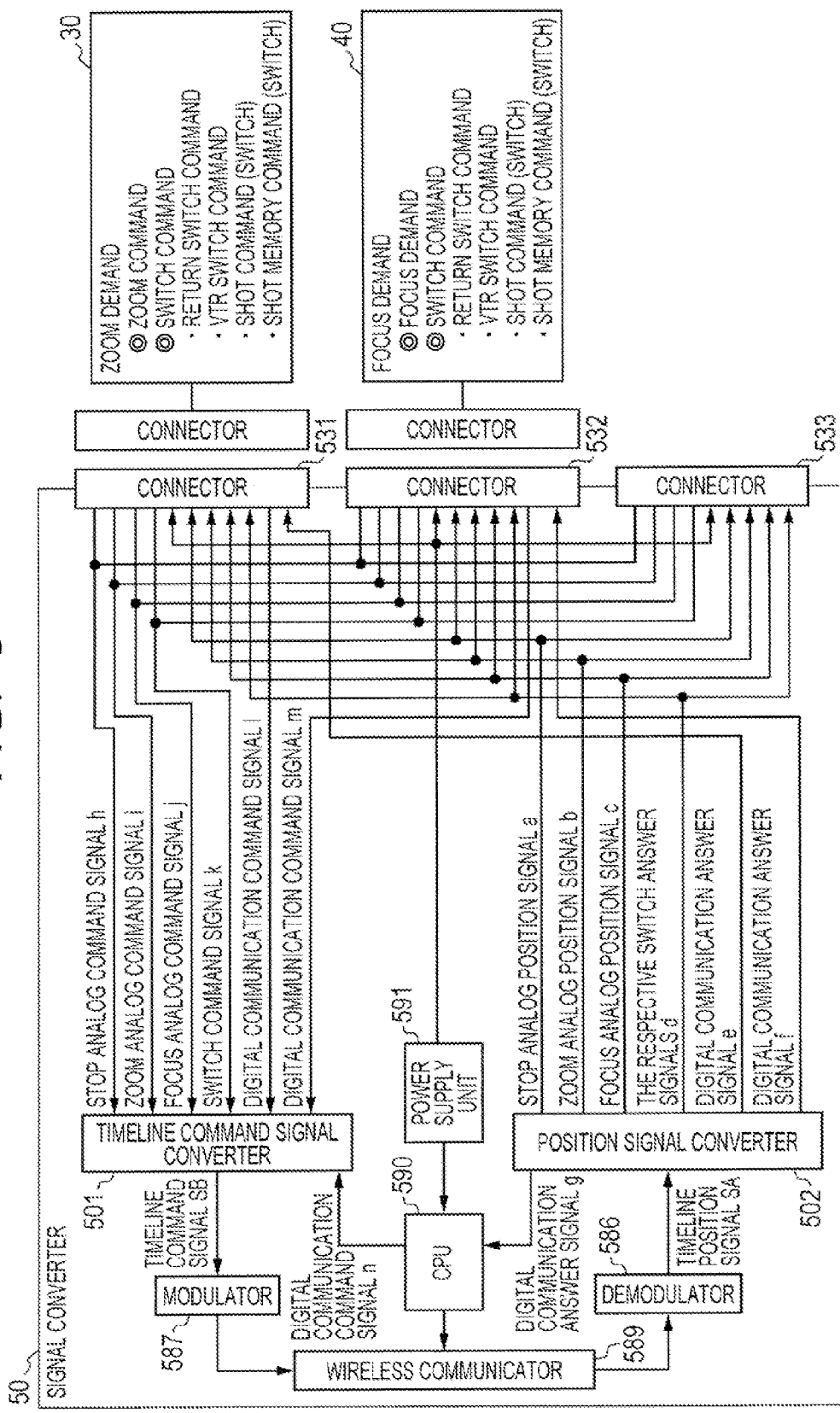
FIG. 3 is a circuit block diagram of a zoom demand, a focus demand, and a signal converter.

FIG. 3 is a circuit block diagram of the zoom demand 30, the focus demand 40, and the signal converter 50. The zoom demand 30 and the focus demand 40 are connected to the signal converter 50 via cables and connectors 531, 532, and 533.

The zoom demand 30 outputs a zoom command signal as well as switch command signals including a return switch command signal, a VTR switch command signal, a shot command signal, and a shot memory command signal. In addition, the focus demand 40 outputs the focus command signals as well as the switch command signals including the return switch signal, the VTR switch signal, the shot command signal, and the shot memory command signal. The return switch is a switch for displaying an image that is actually being used for broadcast at present on a monitor of an image pickup apparatus. The VTR switch is a switch for outputting an image that is being taken by the image pickup apparatus as a video signal externally from the image pickup apparatus. The shot command is a command for driving the image pickup apparatus to have predetermined lens positions (zoom and focus) that are stored in advance. The shot memory command is a command for storing a lens position to be moved by the shot command.

(Structure of Signal Converter)

In the signal converter 50, signals obtained via the connectors 531, 532, and 533 are supplied to a timeline command signal converter 501. Further, a signal from a CPU 590 is delivered to the timeline command signal converter 501. These signals are the stop, zoom, and focus analog command signals h, i, and j, switch command signals k, and the digital communication command signals l, m, and n. The timeline command signal SB converted by the timeline command signal converter 501 is delivered to a wireless communicator 589 via a modulator 587.

In addition, the timeline position signal SA obtained from the lens body 20 via the wireless communicator 589 is delivered to a position signal converter 502 via a demodulator 586. The stop, zoom, and focus analog position signals a, b, and c, switch answer signals d, and the digital communication answer signals e, f, and g are output by conversion in the position signal converter 502. The stop, zoom, and focus analog position signals a, b, and c and the digital communication answer signals e and f are delivered to the zoom demand 30 and the focus demand 40 via the connectors 531 to 533. On the other hand, the digital communication answer signal g is delivered to the CPU 590.

In addition, the CPU 590 delivers to the wireless communicator 589 information for designating a communication target.

Power output from a power supply unit 591 is connected to the zoom demand 30 and the focus demand 40 via the connectors 531, 532, and 533. In addition, a power supply capacity state of the power supply unit 591 is delivered to the CPU 590.

In this signal converter 50, the connectors 531, 532, and 533 are connected to the demands such as the zoom demand 30 and the focus demand 40 via cables. The connectors 531, 532, and 533 have a multi-pin structure having approximately 20 pins similarly to the conventional example. The timeline command signal converter 501 is supplied with the stop, zoom, and focus analog command signals h, i, and j, switch command signals k, and the digital communication command signals l and m via the connectors 531, 532, and 533. In addition, the timeline command signal converter 501 receives a digital communication command signal n from the CPU 590. The timeline command signal converter 501 converts these signals into the timeline command signal SB.

The modulator 587 modulates the timeline command signal SB. The wireless communicator 589 transmits the modulated timeline command signal SB from the modulator 587 by wireless communication and receives the wireless timeline position signal SA transmitted from the wireless communicator 289 of the lens body 20.

The demodulator 586 demodulates the timeline position signal SA received and modulated by the wireless communicator 589. The position signal converter 502 divides the timeline position signal SA from the demodulator 586 into the stop, zoom, and focus analog position signals a, b, and c, switch answer signals d, and the digital communication answer signals e, f, and g, and outputs the signals.

As the power supply unit 591, a battery, an AC adapter, and the like are used, which are necessary for operations of the zoom demand 30, the focus demand 40, and the signal converter 50.

As the wireless communicators 289 and 589, it is possible to use a standardized communication method such as a wireless LAN, Bluetooth (trademark), or ZigBee (trademark).

(Process in Timeline Command Signal Converter of Signal Converter)

Figure 4:
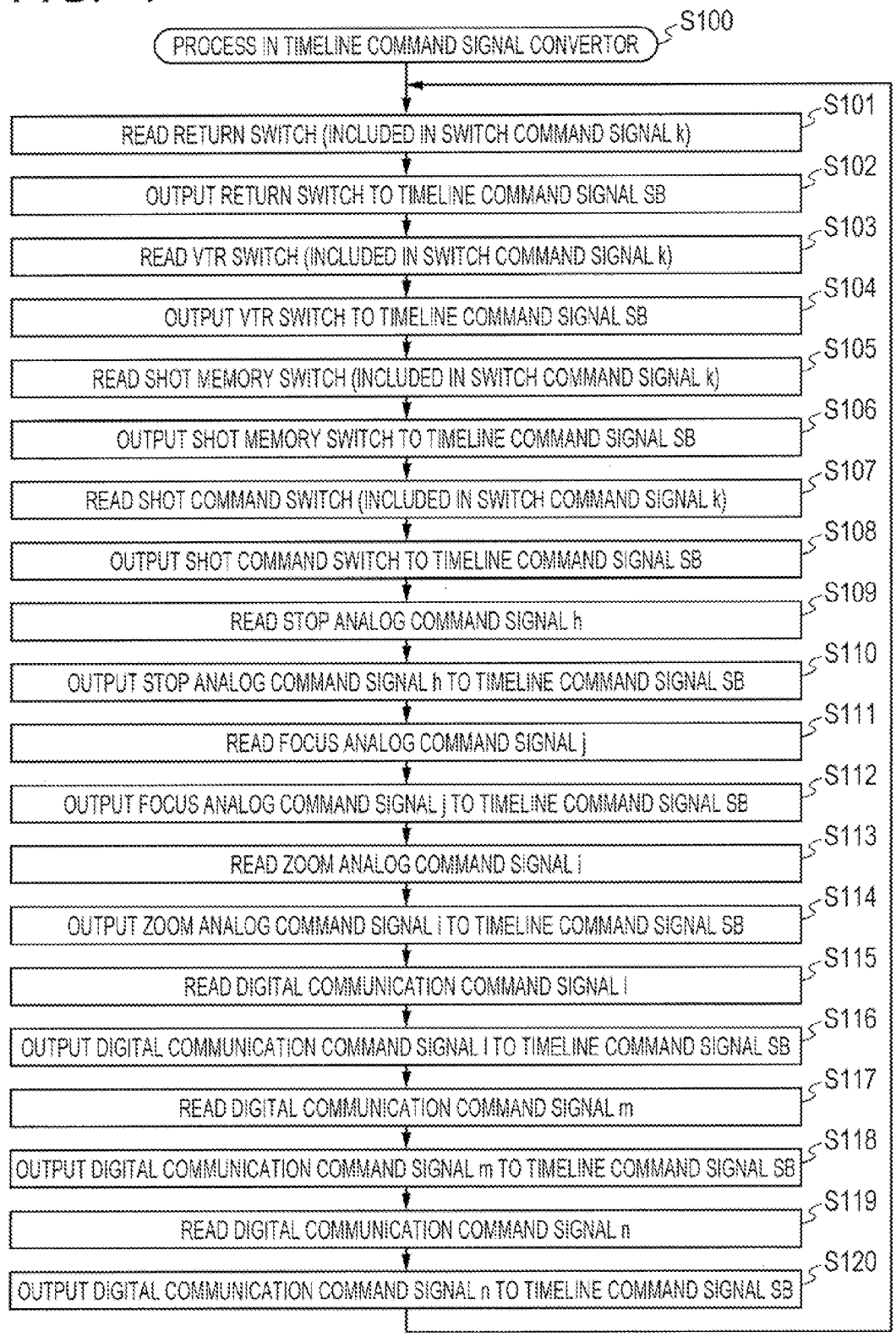
FIG. 4 is a process flowchart in a timeline command signal converter 501.

FIG. 4 is a process flowchart in the timeline command signal converter 501 of the signal converter 50. In Step S100, the process in the timeline command signal converter 501 is started. The return switch signal contained in switch command signals k from the demands 30 and 40 is read in Step S101, and the result is output as the timeline command signal SB in Step S102. The VTR switch signal contained in switch command signals k from the demands 30 and 40 is read in Step S103, and the result is output as the timeline command signal SB in Step S104.

Next, the shot memory switch signal contained in switch command signals k from the demand is read in Step S105, and the result is output as the timeline command signal SB in Step S106. The shot command switch signal contained in switch command signals k from the demands 30 and 40 is read in Step S107, and the result is output as the timeline command signal SB in Step S108.

The stop analog command signal h from the demands 30 and 40 is read in Step S109, and the value is output as the timeline command signal SB in Step S110. The focus analog command signal j from the demand 40 is read in Step S111, and the value is output as the timeline command signal SB in Step S112. Next, the zoom analog command signal i from the demand 40 is read in Step S113, and the value is output as the timeline command signal SB in Step S114.

The command in the digital communication command signal 1 from the demands 30 and 40 is read in Step S115 and is output as the timeline command signal SB in Step S116. The digital communication command signal m from the demands 30 and 40 is read in Step S117 and is output as the timeline command signal SB in Step S118. The digital communication command signal n from the demands 30 and 40 is read in Step S119 and is output as the timeline command signal SB in Step S120. After this, the process flow returns to Step S101, and the same process is repeated.

Figure 5:
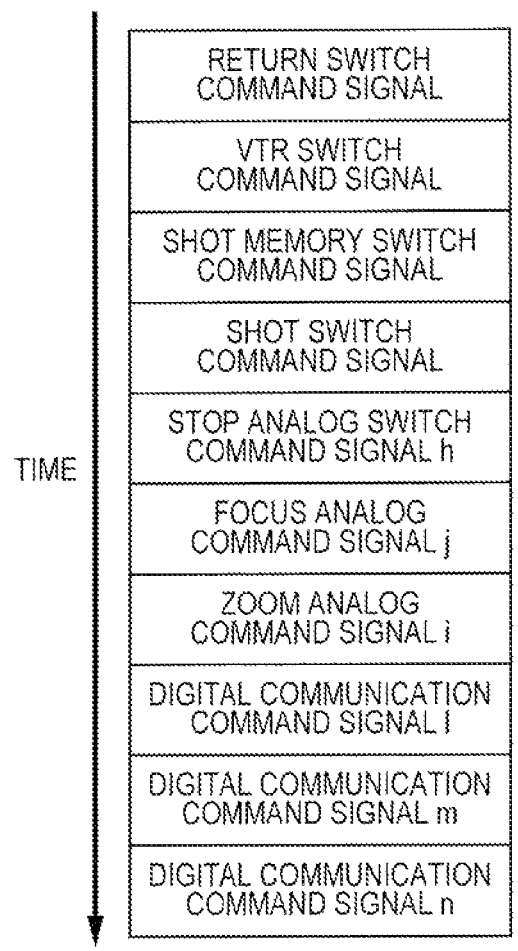
FIG. 5 is a detailed diagram of the timeline command.

Through the above-mentioned process, multiple command signals supplied from multiple demands 30 and 40 can be a series of timeline command signals SB illustrated in FIG. 5. Further, different communication methods such as a contact signal and a serial communication signal can be contained in the series of timeline command signals SB. After this, the wireless timeline command signal SB modulated by the modulator 587 and the wireless communicator 589 is transmitted to the lens body 20.

(Process in Command Signal Converter of Lens Body)

Figure 6:
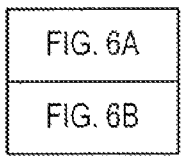
FIG. 6, which is composed of FIGS. 6A and 6B, is a process flowchart in a command signal converter.
Figure 6A:
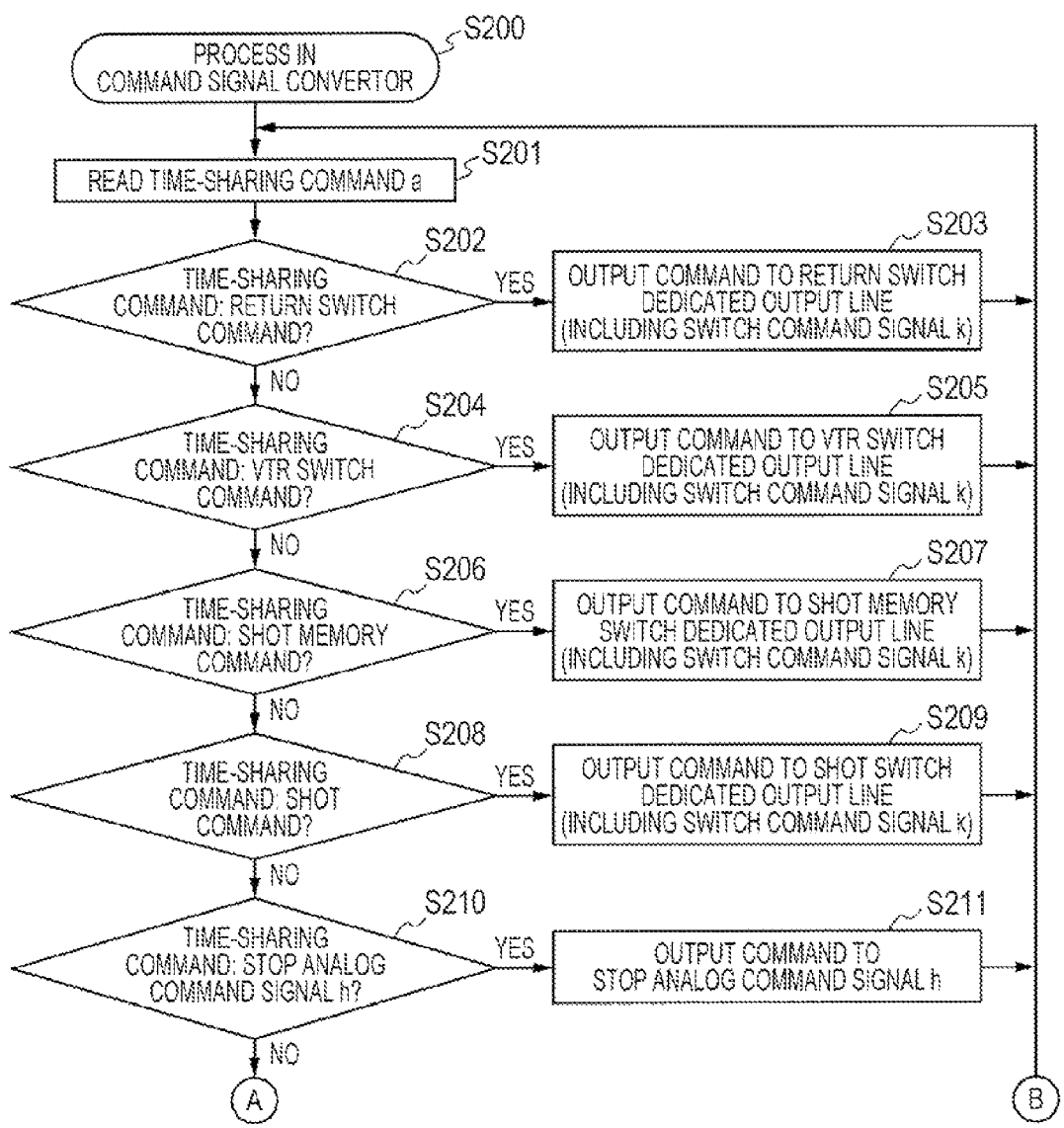
Figure 6B:
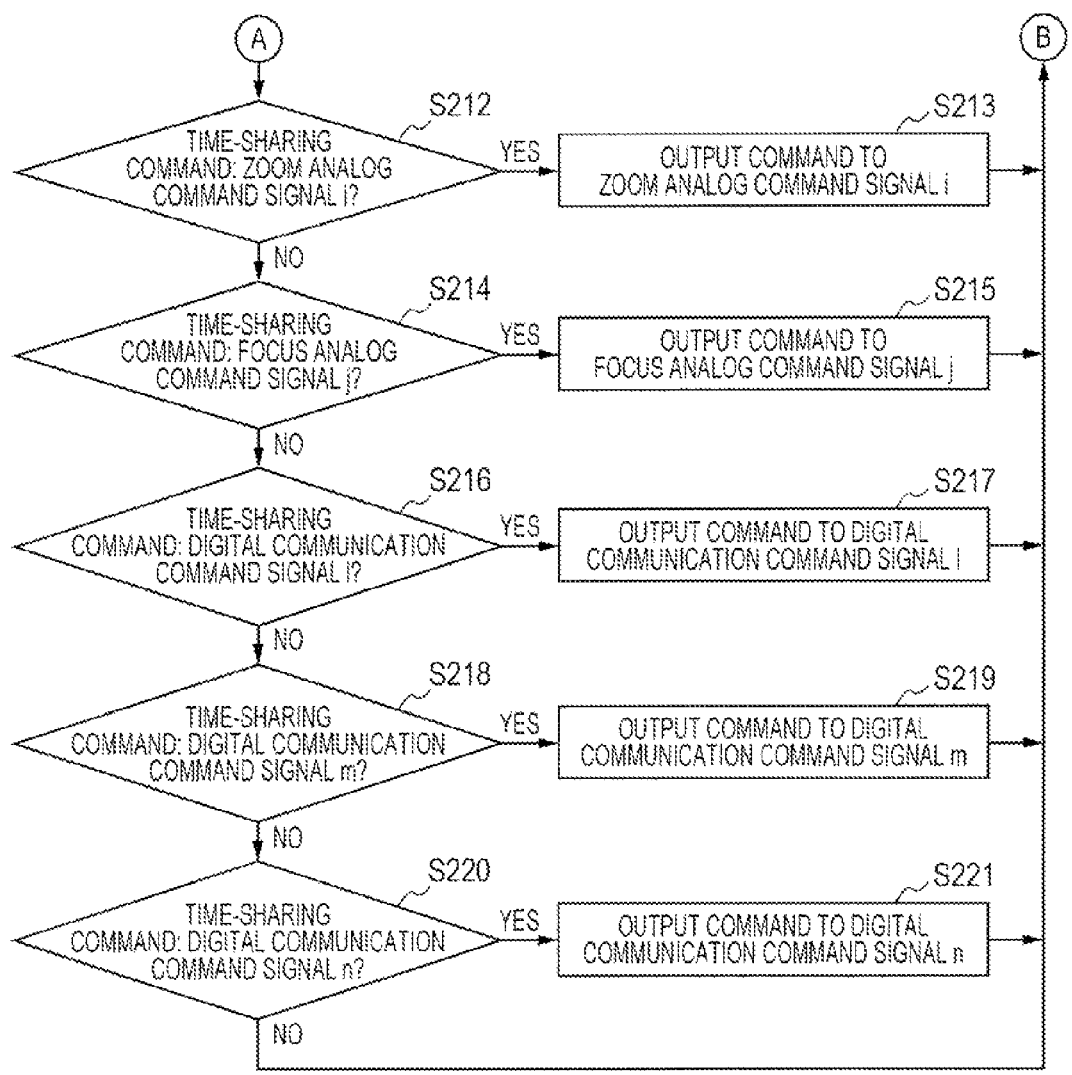

FIGS. 6A and 6B are process flowcharts in the command signal converter 282 of the lens body 20. In Step S200, the process in the command signal converter 282 starts. A time-sharing command signal is read in Step S201, and it is determined in Step S202 whether or not the time-sharing command signal is the return switch command signal. When the time-sharing command signal is the return switch command signal, the process flow proceeds to Step S203. Otherwise, the process flow proceeds to Step S204. In Step S203, the value is output to a return switch dedicated output line containing switch command signals k, and after that, the process flow returns to Step S201.

In Step S204, it is determined whether or not the read time-sharing command signal is the VTR switch command signal. When the read time-sharing command signal is the VTR switch command signal, the process flow proceeds to Step S205. Otherwise, the process flow proceeds to Step S206. In Step S205, the value is output to a VTR switch dedicated output line containing switch command signals k, and after that, the process flow returns to Step S201.

In Step S206, it is determined whether or not the read time-sharing command signal is the shot memory command signal. When the read time-sharing command signal is the shot memory command signal, the process flow proceeds to Step S207. Otherwise, the process flow proceeds to Step S208. In Step S207, the value is output to a shot memory switch dedicated output line containing switch command signals k, and after that, the process flow returns to Step S201.

In Step S208, it is determined whether or not the read time-sharing command signal is the shot command signal. When the read time-sharing command signal is the shot command signal, the process flow proceeds to Step S209. Otherwise, the process flow proceeds to Step S210. In Step S209, the value is output to a shot switch dedicated output line containing switch command signals k, and after that, the process flow returns to Step S201.

In Step S210, it is determined whether or not the read time-sharing command signal is the stop analog command signal h. When the read time-sharing command signal is the stop analog command signal h, the process flow proceeds to Step S211. Otherwise, the process flow proceeds to Step S212. In Step S211, the value is output as the stop analog command signal h, and after that, the process flow returns to Step S201.

In Step S212, it is determined whether or not the read time-sharing command signal is the zoom analog command signal i. When the read time-sharing command signal is the zoom analog command signal i, the process flow proceeds to Step S213. Otherwise, the process flow proceeds to Step S214. In Step S213, the value is output as the zoom analog command signal i, and after that, the process flow returns to Step S201.

In Step S214, it is determined whether or not the read time-sharing command signal is the focus analog command signal j. When the read time-sharing command signal is the focus analog command signal j, the process flow proceeds to Step S215. Otherwise, the process flow proceeds to Step S216. In Step S215, the value is output as the focus analog command signal j, and after that, the process flow returns to Step S201.

In Step S216, it is determined whether or not the read time-sharing command signal is the digital communication command signal 1. When the read time-sharing command signal is the digital communication command signal 1, the process flow proceeds to Step S217. Otherwise, the process flow proceeds to Step S218. In Step S217, the value is output as the digital communication command signal 1, and after that, the process flow returns to Step S201.

In Step S218, it is determined whether or not the read time-sharing command signal is the digital communication command signal m. When the read time-sharing command signal is the digital communication command signal m, the process flow proceeds to Step S219. Otherwise, the process flow proceeds to Step S220. In Step S219, the value is output as the digital communication command signal m, and after that, the process flow returns to Step S201.

In Step S220, it is determined whether or not the read time-sharing command signal is the digital communication command signal n. When the read time-sharing command signal is the digital communication command signal n, the process flow proceeds to Step S221. Otherwise, the process flow returns to Step S201. In Step S221, the value is output as the digital communication command signal n, and after that, the process flow returns to Step S201.

Through the above-mentioned process, original various command signals are restored from the timeline command signal SB received via the wireless communicator 289 and the demodulator 286 by the command signal converter 282 in the lens body 20.

In addition, the process in the timeline position signal converter 284 is similar to that in the timeline command signal converter 501 illustrated in FIGS. 4 and 5, and the process in the position signal converter 502 is similar to that in the command signal converter 282 illustrated in FIGS. 6A and 6B.

The communication condition monitoring unit 291 disposed in the lens body 20 monitors a communication condition of the wireless communicator 289. Specifically, the wireless communicator 289 checks whether or not appropriate transmission and reception of data has been performed every transmission and reception data or every predetermined time period, and the result is displayed as a value index on a communication condition display unit (not shown). The check in this case can be performed by communicating a communication error rate that is a ratio of the number of pieces of data of reception errors to the number of pieces of received data bidirectionally on the transmission side. In addition, the communication condition of the wireless communicator 289 can be monitored also by monitoring a value of a wireless reception level. This information of the communication condition is delivered to the communication stop factor determinator 292 and becomes a criterion of determination for the communication stop factor.

(Determination Method for Communication Stop Factor Performed by the Communication Stop Factor Determinator)

Next, the determination method for the communication stop factor performed by the communication stop factor determinator 292 is described.

As the communication stop factors, the following factors are considered.

R1: The case where the signal converter 50 is powered off
R2: The case where the signal converter 50 switches communication to another lens body
R3: The case where the cable between the signal converter 50 and the demand 30 or 40 is disconnected
R4: The case where the battery of the signal converter 50 has run out
R5: The case where the signal converter 50 moves to the outside of the wireless communication area of the lens body 20
R6: The case where a communication failure in the wireless communication has occurred due to electric wave from another apparatus Among the above-mentioned factors, the factors R1, R2, and R3 are considered to occur when a user has intentionally disconnected communication between the lens body 20 and the signal converter 50. On the other hand, the factors R4, R5, and R6 are considered to occur when communication between the lens body 20 and the signal converter 50 is disconnected without a user's intention. The method of setting the command value for cases of the intentional disconnection and the unintentional disconnection are described later.

Next, the determination method for these factors is described.

(Circuit Block Diagram of Wireless Communicator in Frequency Hopping Spread Spectrum)

Figure 7:
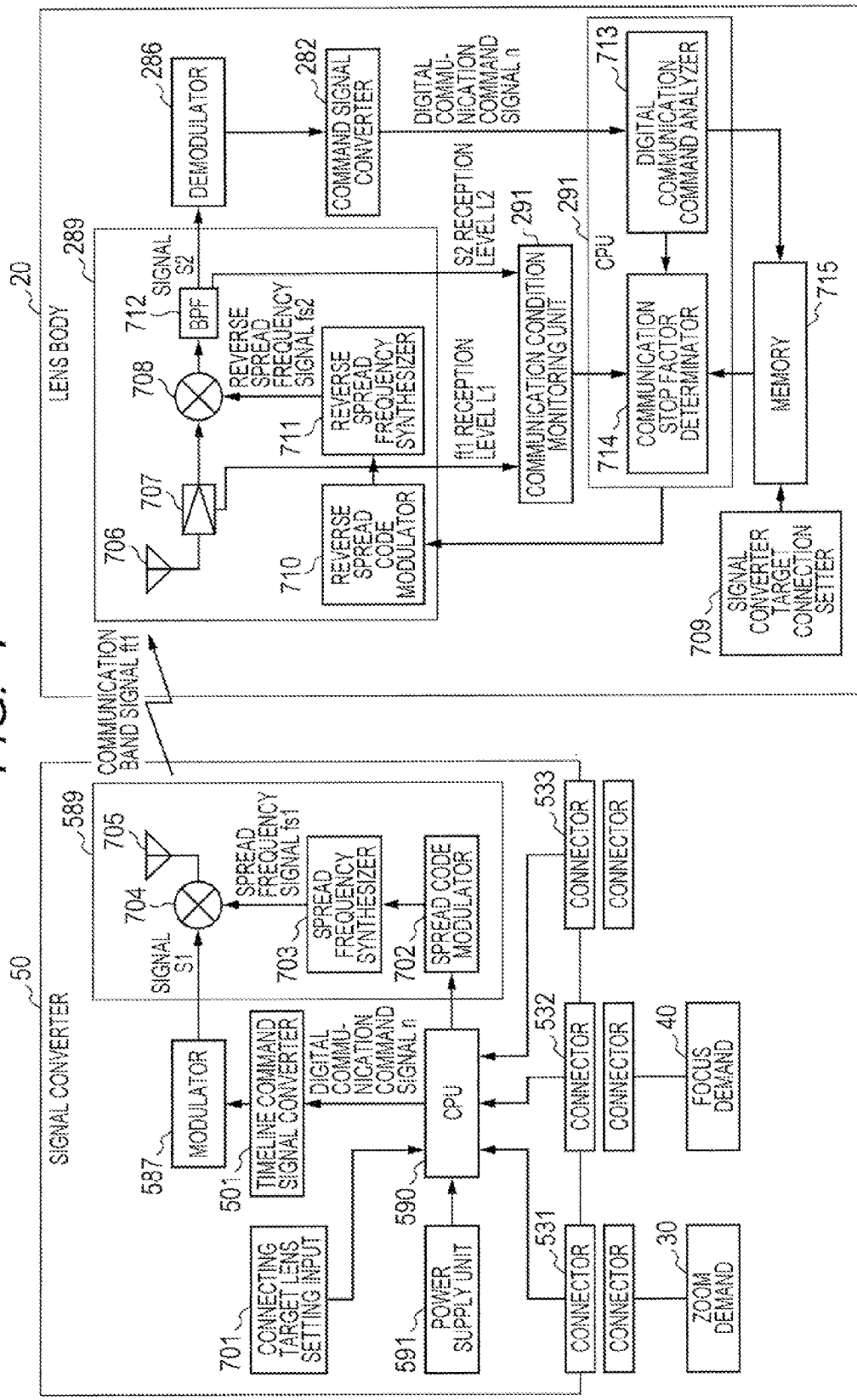
FIG. 7 is a circuit block diagram in a frequency hopping spread spectrum wireless communication.

FIG. 7 is a circuit block diagram in the case where the wireless communicator is constituted by using frequency hopping spread spectrum. The same function as that in FIGS. 2 and 3 is denoted by the same reference symbol, and overlapping description is omitted.

A connecting target lens setting input unit 701 is an input unit for inputting a set value for determining the lens body 20 to be connected by wireless and is connected to the CPU 590. A spread code modulator 702 is a modulator for generating a spread code for generating a hopping frequency and is connected to an output from the CPU 590. A spread frequency synthesizer 703 is a signal generator that generates the hopping frequency and can change the oscillating frequency at high speed, and is connected to the spread code modulator 702. A spread frequency converter 704 is a frequency converter for spreading frequency of the output signal from the modulator 587 and is connected to the modulator 587 and the spread frequency synthesizer 703. A transmitting antenna 705 and a receiving antenna 706 are antennas for performing the wireless communication.

A high-frequency amplifier 707 is a signal amplifier for amplifying a frequency hopping communication wave in real space and is connected to the receiving antenna 706. A reverse spread frequency converter 708 is a frequency converter for reversely spreading frequency of the frequency hopping communication wave and is connected to the high-frequency amplifier 707. A signal converter target connection setter 709 is an input unit for supplying a set value for determining the signal converter 50 to be connected by wireless and is connected to a memory 715. A reverse spread code modulator 710 is a modulator for generating a spread code of the hopping frequency and is connected to an output from a CPU 291.

A reverse spread frequency synthesizer 711 is a signal generator for generating the hopping frequency and can change the oscillating frequency at high speed, and is connected to the reverse spread code modulator 710. A band pass filter (BPF) 712 is a narrow band pass filter (BPF) for removing noise components in the signal after reverse spreading in the reverse spread frequency converter 708. A digital communication command analyzer 713 is an analyzer for analyzing command contents of the digital communication command signals l, m, and n, and exists in the CPU 291. A communication stop factor determinator 714 is a determination unit for determining the factor that has caused the wireless communication stop to/from the signal converter 50 and is included in the CPU 291. The memory 715 is a memory for storing information for specifying the signal converter 50 to be a wireless communication target or information for specifying another lens body 20 when the signal converter 50 to be a wireless communication target is connected to multiple lens bodies 20.

When the information for specifying the lens body to be a wireless connection target is input by the connecting target lens setting input unit 701, the information is delivered to the spread code modulator 702 via the CPU 590. The spread code modulator 702 stores a spread code (hopping pattern) having a frequency corresponding to the wireless connection target. Based on this spread code, the spread frequency synthesizer 703 generates a spread frequency signal fs1 having a frequency that varies on time base. As to a spread code M1 used here, the same spread code is stored in both the wireless communication targets, so as to be the same spread code as a spread code M2 to be used in the lens body 20 described later. A signal S1 from the modulator 587 is multiplied by the spread frequency signal fs1 from the spread frequency synthesizer 703 in the spread frequency converter 704 and is transmitted to the real space as a communication band signal ft1 by the transmitting antenna. In this case, the communication band signal ft1 becomes a signal having a frequency varying according to a frequency variation of the spread frequency signal fs1 in a communication band. The communication band signal ft1 is received by the receiving antenna 706 and is amplified by the high-frequency amplifier 707 to be a level that can be internally processed. In this case, at the same time as the signal amplification, the high-frequency amplifier 707 delivers a reception level L1 and an amplification ratio G1 of the communication band signal ft1 received by the receiving antenna 706 to the communication condition monitoring unit 291.

The communication band signal ft1 amplified by the high-frequency amplifier 707 is supplied to the reverse spread frequency converter 708.

On the other hand, when the information for specifying the signal converter 50 to be a wireless connection target is input by the signal converter target connection setter 709, the information is delivered to the reverse spread code modulator 710 via the memory 715 and the CPU 291. The reverse spread code modulator 710 stores a spread code (hopping pattern) having a frequency corresponding to the wireless connection target. Based on this spread code, the reverse spread frequency synthesizer 711 generates a reverse spread frequency signal fs2 having a frequency varying on time base. As to the spread code M2 that is used here, the same spread code is stored in both the wireless communication targets, so as to be the same spread code as the spread code M1 that is used in the above-mentioned signal converter 50. Further, the reverse spread code modulator 710 detects synchronization timing of the spread frequency signal fs1 based on the communication band signal ft1 amplified by the high-frequency amplifier 707 and the spread code (hopping pattern) of the frequency, and generates the reverse spread frequency signal fs2. Thus, the reverse spread frequency signal fs2 is generated as a signal that synchronizes with the spread frequency signal fs1 generated by the signal converter 50 to be a wireless connection target so as to change the frequency.

The communication band signal ft1 amplified by the high-frequency amplifier 707 is delivered to the band pass filter (BPF) 712 as a signal S2 that is multiplied by the reverse spread frequency signal fs2 from the reverse spread frequency synthesizer 711 in the reverse spread frequency converter 708. The signal S2 after noise components are removed in the band pass filter (BPF) 712 is delivered to the demodulator 286. This signal S2 is generated as a signal equivalent to the signal S1 from the modulator 587 of the signal converter 50 to be a wireless connection target.

Even when the communication band signal ft1 transmitted from a signal converter 50 other than that of the wireless communication target is received by the receiving antenna 706, the signal S2 equivalent to the signal S1 cannot be generated because the spread frequency signal fs1 and the reverse spread frequency signal fs2 are not synchronized with each other. Thus, communication can be performed only between the signal converters 50 of the wireless communication targets specified by the signal converter target connection setter 709.

Further, a signal level L2 of the signal S2 is detected by the band pass filter (BPF) 712 and is delivered to the communication condition monitoring unit 291. The communication condition monitoring unit 291 divides the signal level L2 by the amplification ratio G1 so as to convert the signal level L2 into a signal level L3 before the amplification. The communication condition monitoring unit 291 delivers the signal levels L1 and L3 to the communication stop factor determinator 714.

In addition, the signal converter 50 can transmit a state of the signal converter 50 to the lens body 20 by the digital communication command n. As information to be transmitted to the lens body 20, the following pieces of information can be considered.

I1: Information for specifying another lens body 20 (for example, the spread code) in the case where the signal converter 50 operates multiple lens bodies 20

I2: Information for notifying of switching of connection to another lens body 20 in the case where the signal converter 50 operates multiple lens bodies 20

I3: A power supply state (battery status) of the signal converter 50

I4: A connection state between the signal converter 50 and the zoom demand 30 or the focus demand 40

As to these pieces of information, the digital communication command analyzer 713 analyzes the received digital signal command n and transmits the result to the communication stop factor determinator 714. In addition, the information for specifying another lens body 20 is stored in the memory 715.

The communication stop factor determinator 714 determines the communication stop factor from the reception levels L1 and L3 and the state information I2, I3, and I4 of the signal converter 50.

Figure 8:
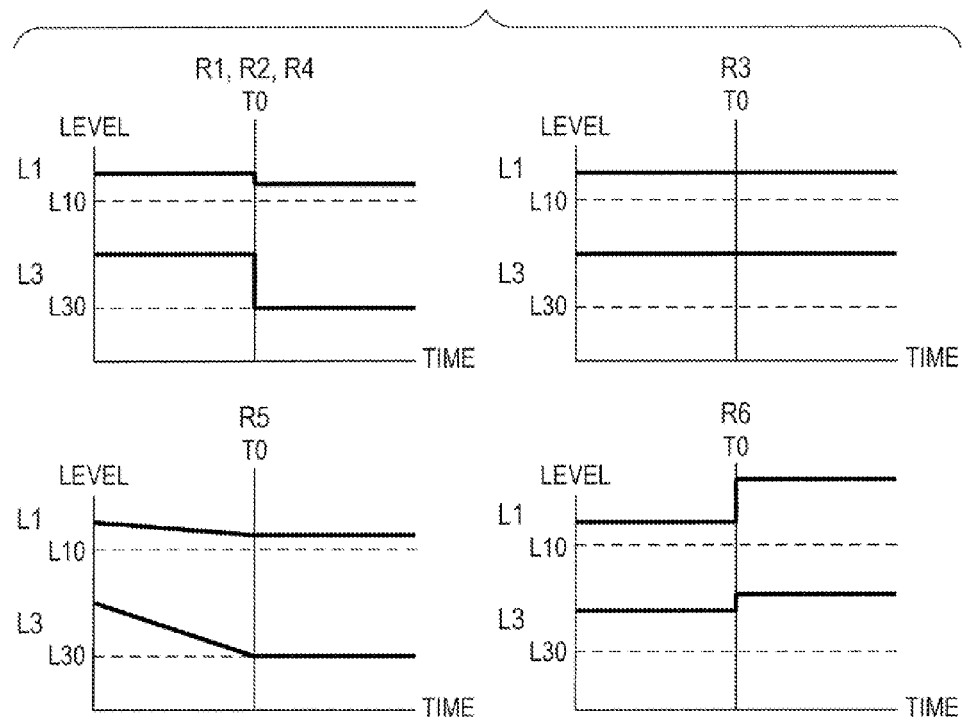
FIG. 8 is a graph showing reception levels for individual factors when communication stop occurs.

FIG. 8 illustrates a manner of variation of the reception levels L1 and L3 due to the communication stop factors R1 to R6. Here, T0 indicates wireless communication stop timing, and reception levels L10 and L30 indicate lowest level values of reception sensitivity of L1 and L3, respectively. In the case where the signal converter 50 is powered off (R1), the case where the signal converter 50 switches communication to another lens body (R2), and the case where the battery of the signal converter 50 has run out (R4), there is no wireless signal from the signal converter 50. Therefore, the value of L3 is decreased to L30 at the time T0. In the case where the cable between the signal converter 50 and the demand 30 or 40 is disconnected (R3), there is no change in wireless communication. Therefore, there is no change of L1 and L3 before and after T0. In the case where the signal converter 50 moves to the outside of the wireless communication area of the lens body 20 (R5), the value of L3 gradually approaches L30 to be the value of L30 at last. This is because the distance between the signal converter 50 and the lens body 20 increases so that the communication band signal ft1 transmitted from the signal converter 50 is attenuated to reach the lens body 20. In the case where a communication failure in the wireless communication has occurred due to an electric wave from another apparatus (R6), a total level of the communication band is increased so that L1 is rapidly increased at the time T0. In this case, the level value of L3 is increased, but noise content is included much so that the timeline command signal SB cannot be demodulated in the demodulator 286.

As described above, the factors R1, R2, and R4, and the factors R3, R5, and R6 can be identified based on the situation when the wireless communication is stopped.

Next, a determination method for discriminating the case where the cable between the signal converter 50 and the demand 30 or 40 is disconnected (R3) from a normal state is described.

Figure 9:
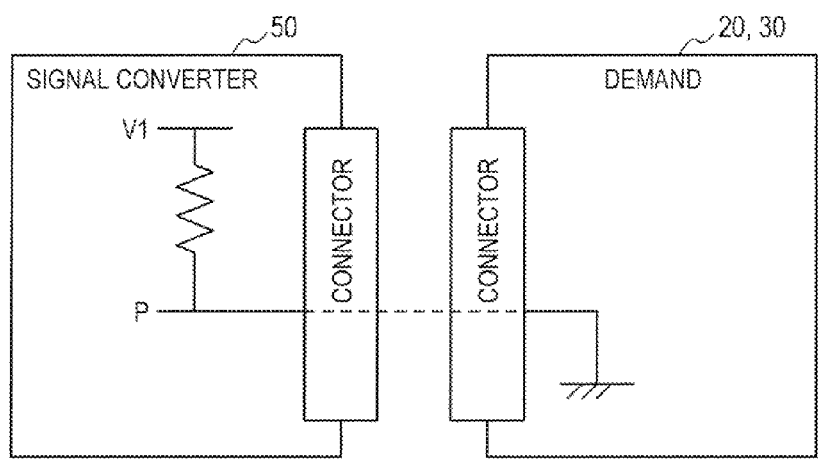
FIG. 9 is a diagram illustrating a circuit for detecting demand connection.

The CPU 590 monitors the connection state between the signal converter and the zoom demand 30 as well as the focus demand 40. When the demand becomes a disconnected state, the information I4 is transmitted via the digital communication command signal n so that the disconnected state of the demand is notified to the lens body 20. When the communication stop factor determinator 714 knows from the information I4 that the demand has become the disconnected state, the communication stop factor determinator 714 determines the communication stop factor to be the factor R3. The method for the CPU 590 to monitor the connection states of the demands 30 and 40 may be a method in which a voltage P is monitored by the structure as illustrated in FIG. 9, and in which, when the voltage P is V1, it is determined to be the disconnected state, and when the voltage P is 0 V, it is determined to be the connected state. In addition, when the demands 30 and 40 are connected, the power supply unit 591 supplies power to the demands 30 and 40. Therefore, it is possible to monitor a voltage of the power supply unit 591 and to determine that the demands 30 and 40 are disconnected when the voltage is decreased to a predetermined voltage or lower. In addition, when the demands 30 and 40 transmit the digital communication command signals l and m, respectively, it is possible to adopt a method in which the digital communication command analyzer 713 monitors states of the digital communication command signals l and m.

Next, determination of the factors R1, R2, and R4 is described.

First, a determination method in the case where the signal converter 50 switches communication to another lens body (R2) is described. When switching of the wireless communication target occurs in the connecting target lens setting input unit 701, the CPU 590 transmits the information I1 and I2 via the digital communication command signal n so as to inform the lens body 20 of the switching of the wireless connection target. After transmitting the information I1 and I2, the CPU 590 delivers to the spread code modulator 702 the information for specifying the wireless communication target to be switched so as to change the wireless communication target. When the wireless communication becomes the communication stop state after the information I2 (for notifying switching of connection to another lens body 20 in the case where the signal converter 50 operates multiple lens bodies 20) is received, the communication stop factor determinator 714 determines the communication stop factor to be the factor R2.

In addition, a determination method for the factor R2 in the case where the communication stop factor determinator 714 has received the information I1 in advance and does not receive the information I2 is described.

When the communication stop factor determinator 714 detects the wireless communication stop state to/from the signal converter 50, the communication stop factor determinator 714 delivers to the reverse spread code modulator 710 the identification information of another lens body 20 that can be connected to the signal converter 50 as known through the information I1 in advance. The communication stop factor determinator 714 monitors the reception level L3. When the communication stop factor determinator 714 determines that the reception level L3 is a predetermined threshold value or higher in a predetermined time period, the communication stop factor determinator 714 determines that the signal converter 50 has switched the wireless communication target to another lens body 20. In other words, it is determined that the communication stop factor is the factor R2.

Next, as to a determination method in the case where the battery of the signal converter 50 has run out (R4), the battery state is monitored from the information (power supply state (battery status) of the signal converter 50). When the communication stop occurs after the state where the battery status is low, it is determined that the communication stop is caused by the factor R4.

As to a determination method in the case where the signal converter 50 is powered off (R1), when it is determined that the communication stop has occurred by a factor other than the factors R2 to R6, it is determined that the communication stop has occurred due to the factor R1.

Figure 10:
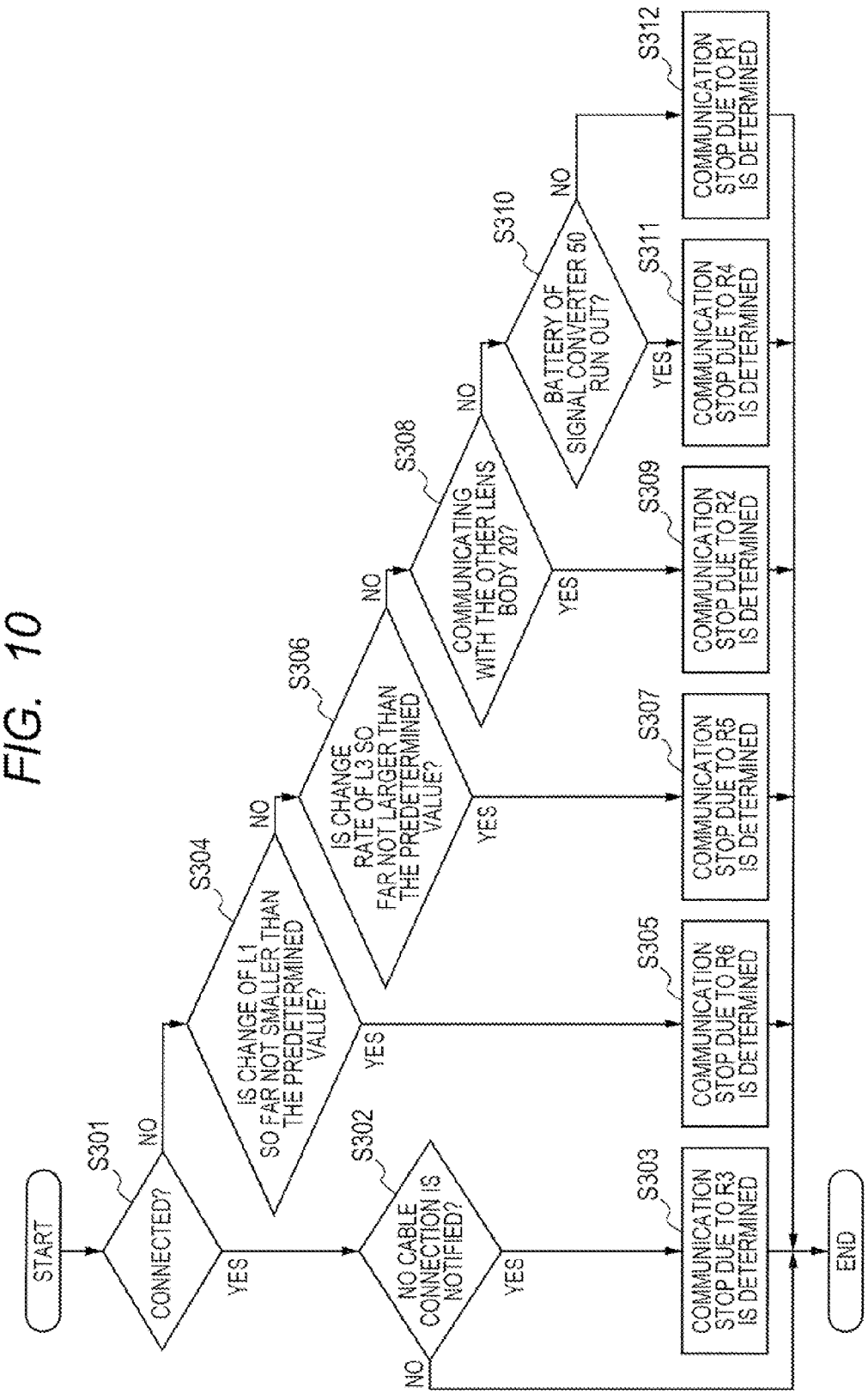
FIG. 10 is a flowchart of a determination process of a wireless communication stop factor.

FIG. 10 is a flowchart of determinations of the factors R1 to R6. This flowchart is performed when the wireless communication condition is the connected state.

After starting the determination, it is determined in Step S301 whether or not the wireless communication condition is the connected state. When the wireless communication condition is the connected state, the process flow proceeds to Step S302. When the wireless communication condition is not the connected state, the process flow proceeds to Step S304.

In Step S302, the information I4 is monitored. When a connection state between the signal converter 50 and the demand 30 or 40 becomes the disconnected state and when it is determined that the cable is disconnected, the process flow proceeds to Step S303. When it is determined that the cable is not disconnected, the determination process of the communication stop is finished as it is.

In Step S303, it is determined that the communication stop factor is R3, and the determination process of the communication stop is finished.

In Step S304, when a variation amount of the reception level L1 becomes a predetermined value or larger in a predetermined time period, it is determined that a disturbance wave is received, and the process flow proceeds to Step S305. Otherwise, the process flow proceeds to Step S306.

In Step S305, it is determined that the communication stop factor is R6, and the determination process of the communication stop is finished.

In Step S306, a rate of variation of the reception level L3 in a predetermined past period is checked. When the rate of variation per unit time has been a constant value or lower, it is determined that the distance between the lens body 20 and the signal converter 50 has gradually increased so as to be outside the wireless communication area, and the process flow proceeds to Step S307.

In Step S307, it is determined that the communication stop factor is R5, and the determination process of the communication stop is finished.

In Step S308, it is checked whether or not the signal converter 50 is communicating to/from another lens body 20. When it is determined that the signal converter 50 is communicating with another lens body 20, the process flow proceeds to Step S309.

In Step S309, it is determined that the communication stop factor is R2, and the determination process of the communication stop is finished.

In Step S310, when it is determined from the information I3 that the communication stop is caused because the battery of the signal converter 50 has run out, the process flow proceeds to Step S311. Otherwise, the process flow proceeds to Step S313.

In Step S311, it is determined that the communication stop factor is R4, and the determination process of the communication stop is finished.

In Step S313, it is determined that the communication stop factor is R1, and the determination process of the communication stop is finished.

As described above, it is possible to identify the communication stop factor on the lens body 20 side and to perform a process corresponding to the communication stop factor.

Figure 11:
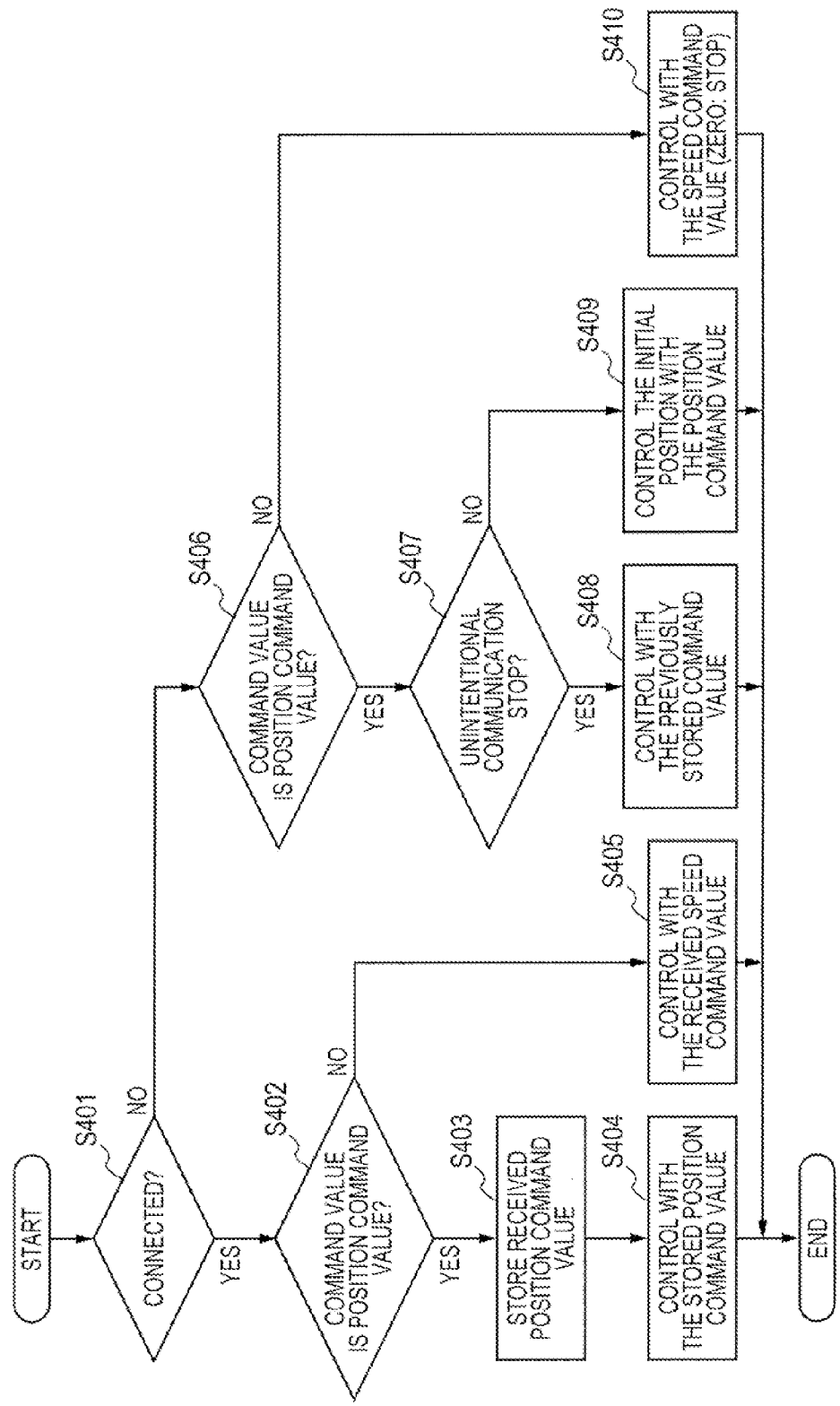
FIG. 11 is a flowchart of a command value determination process flowchart in a wireless communication connection state.

Next, a method of setting the command value in each case of the intentional disconnection and the unintentional disconnection is described. FIG. 11 is a flowchart for determining a drive command value for driving and controlling the movable optical members (the stop, the zoom lens, and the focus lens) to be driven.

After starting, in Step S401, it is checked whether or not the wireless communication condition to/from the signal converter 50 is the connected state. When it is determined that the wireless communication condition is the connected state, the process flow proceeds to Step S402. Otherwise, the process flow proceeds to Step S406.

In Step S402, it is determined whether the command value received from the signal converter 50 is a position command value or a speed command value. When the command value is the position command value, the process flow proceeds to Step S403. Otherwise, the process flow proceeds to Step S405.

Here, in the case of the position command value, the CPU 240 controls a drive target to be driven to a position of the command value. On the other hand, in the case of the speed command value, the CPU 240 controls the drive target to be driven at a speed of the speed command value. In this case, when the speed command value is zero, the drive target is controlled to stay at a current position.

In Step S403, the command value memory 293 stores the current position command value (the latest position command value received from the signal converter 50), and the process flow proceeds to Step S404.

In Step S404, based on the current position command value, position control of the drive target is performed, and the process is finished.

In Step S405, based on the current speed command value (the latest speed command value received from the signal converter 50), speed control of the drive target is performed, and the process is finished.

In Step S406 after branching from Step S401 when it is determined that the wireless communication condition is the disconnected state, it is determined whether the command value received from the signal converter 50 immediately before the wireless communication is disconnected is the position command value or the speed command value. When the command value is the position command value, the process flow proceeds to Step S407. Otherwise, the process flow proceeds to Step S410.

In Step S407, it is determined whether or not the communication stop factor is a communication stop that is not intended by the user (caused by the factors R4 to R6). In the case of the communication stop that is not intended by the user, the process flow proceeds to Step S408. Otherwise, the process flow proceeds to Step S409.

In Step S408, the position control of the drive target is performed based on the position command value stored in Step S403, and the process is finished. Here, instead of the control based on the position command value stored in Step S403, it is possible to perform control of stopping the drive target.

In Step S409, the drive target is driven moved to a predetermined initial position, and the process is finished.

In Step S410, the drive target is stopped, and the process is finished.

Through the above-mentioned process, even when the communication stop that is not intended by the user occurs, the user can control the drive target in accordance with the communication stop factor. Therefore, it is possible to realize the lens operation without a feeling of strangeness for the user.

In addition, in the process of Step S407, when the unintentional communication stop occurs during image photographing or broadcasting, the process flow may proceed to Step S408. In this case, a communication unit (not shown) is disposed between the camera body 10 and the lens body 20 illustrated in FIG. 1, and information during image photographing or broadcasting can be obtained from this communication unit.

Figure 19:
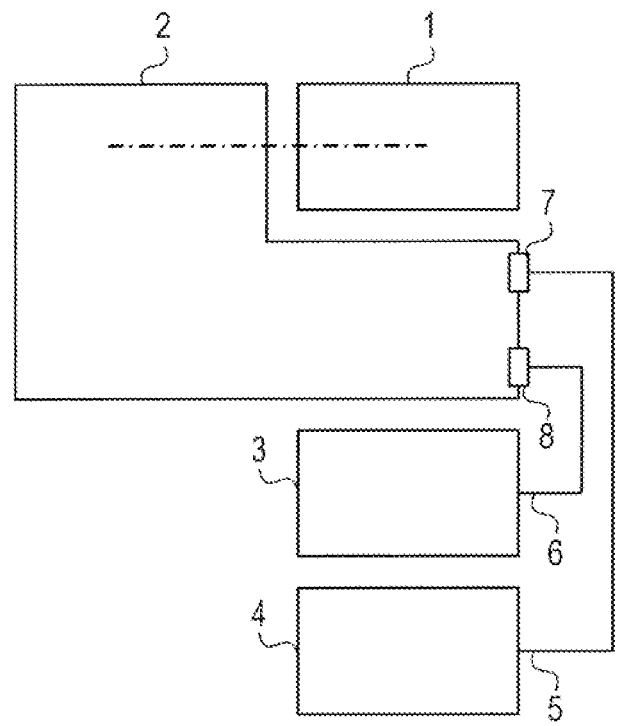
FIG. 19 is a block diagram of a conventional example.

In this embodiment, the command signal converter 282, the timeline position signal converter 284, the demodulator 286, the modulator 287, the wireless communicator 289, and the communication condition monitoring unit 291 are disposed in the lens body 20. However, these units may be disposed as a separate adapter outside the lens body 20. In this case, by additionally disposing this adapter and the signal converter 50 to the existing lens body 20 illustrated in FIG. 19, damage to cables or the like hardly occur while using the existing lens system. Thus, it is possible to improve reliability and operability.

In addition, in the description of the embodiment, the CPU 293, the command signal converter 282, the timeline position signal converter 284, and the communication condition monitoring unit 291 are separated from each other, but those components may be implemented in the same CPU 240.

In addition, in the description of the embodiment, the stop 201, the zoom lens 202, and the focus lens 203 are described as the movable optical members. However, when command control of other movable optical member such as an extender lens, an image stabilizer, or a flange back adjustment macro lens, is performed, the same effect can be obtained.

Second Embodiment

In the following, referring to FIGS. 12, 13, and 14, a second embodiment of the present invention of a generation method of the position command value in the case where the communication stop occurs while the position command value is changing is described.

Figure 12:
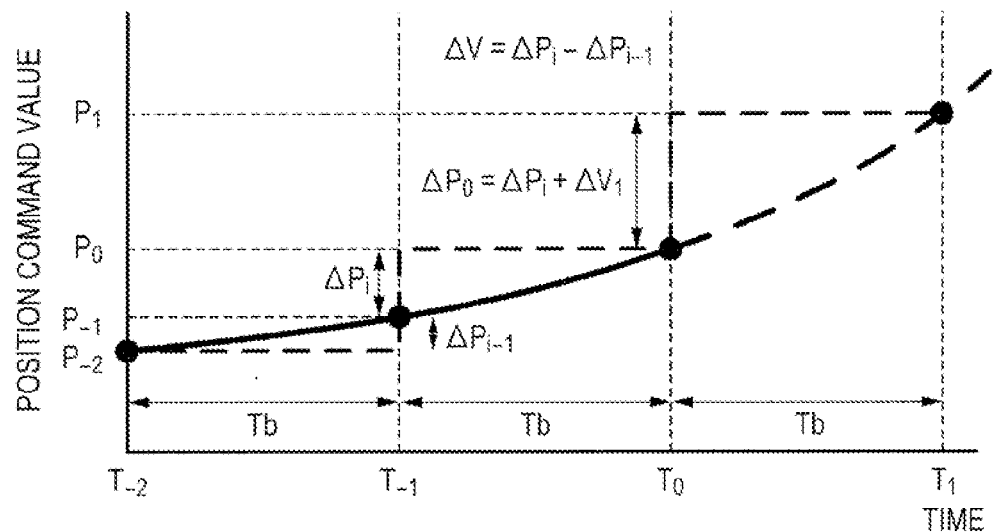
FIG. 12 is a graph showing a position command value variation in wireless communication stop.

FIG. 12 shows a manner of variation of the position command value before and after the communication stop occurs. $T_0$ in FIG. 12 indicates a time when the communication stop occurs, and $P_0$ indicates the position command value at that time. In addition, $P_{-2}$, $P_{-1}$, $P_0$, and $P_1$ indicate position command values at times $T_{-2}$, $T_{-1}$, $T_0$, and $T_1$, respectively. Time interval between the respective adjacent times $T_{-2}$, $T_{-1}$, $T_0$, and $T_1$ is a predetermined time period $T_b$.

A position command value variation amount (amount corresponding to a drive speed) $\Delta P_i$ during the predetermined time period $T_b$ (between the times $T_{-1}$ and $T_0$) immediately before the communication stop occurs can be expressed by the following equation.

$$\Delta P_i = P_{-1} - P_0 \qquad (1)$$

In addition, a variation amount ΔV of the position command value variation amount (hereinafter referred to as a position command value variation rate) during the predetermined time period $T_b$ immediately before the communication stop occurs can be expressed by the following equation.

$$\Delta V = \Delta P_i - \Delta P_{i-1} \quad (2)$$

$$\Delta P_{i-1} = P_{-2} - P_{-1} \quad (2a)$$

Assuming that the position command value variation rate is constant, it is possible to predict and calculate a variation of the position command value after $T_0$ based on the position command value variation amount $\Delta P_i$ and the position command value variation rate $\Delta V$.

Assuming that the position command value variation rate $\Delta V$ is constant, a position command value $P_n$ at a time ($T_n$) after an elapsed time period $T_b \times n$ (n is a natural number) from the time $T_0$ can be expressed by the following equation:

$$P_n = P_{n-1} + (\Delta P_i + \Delta V \times n) \quad (3),$$

where $P_{n-1}$ represents a position command value at a time ($T_n - 1$), which is the predetermined time period $T_b$ before the time $T_n$.

Figure 13:
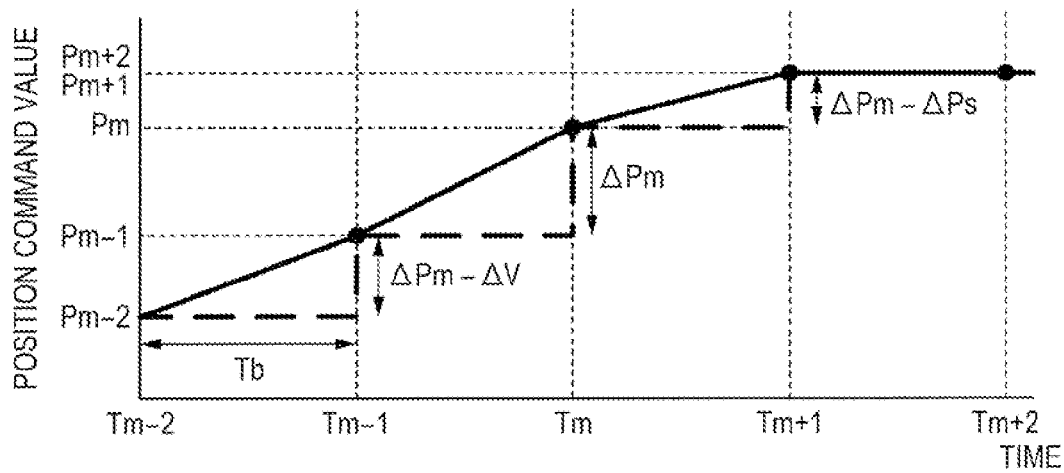
FIG. 13 is a graph showing a position command value variation after the wireless communication stop.

FIG. 13 shows a manner of variation of the position command value in the case where the communication is not the connected state at a time after a constant elapsed time period $T_w$ from the communication stop.

Here, $T_m$ indicates a time after the constant elapsed time period $T_w$ from the time $T_0$, and $P_{m-2}$, $P_{m-1}$, $P_m$, $P_{m+1}$, and $P_{m+2}$ indicate position command values at times $T_{m-2}$, $T_{m-1}$, $T_m$, $T_{m+1}$, and $T_{m+2}$, respectively. A time interval between the respective adjacent times $T_{m-2}$, $T_{m-1}$, $T_m$, $T_{m+1}$, and $T_{m+2}$ is the predetermined time period $T_b$.

When the wireless communication is not the connected state at the time after the constant elapsed time period $T_w$ from the communication stop, the position command value variation amount ΔP is decreased stepwise by a predetermined position command value variation amount $\Delta P_s$ for stop so that a target position command value is set, and the drive is continued and then stopped when the position command value becomes zero. In other words, the drive is performed at a speed lower than the latest speed by a predetermined amount.

Figure 14B:
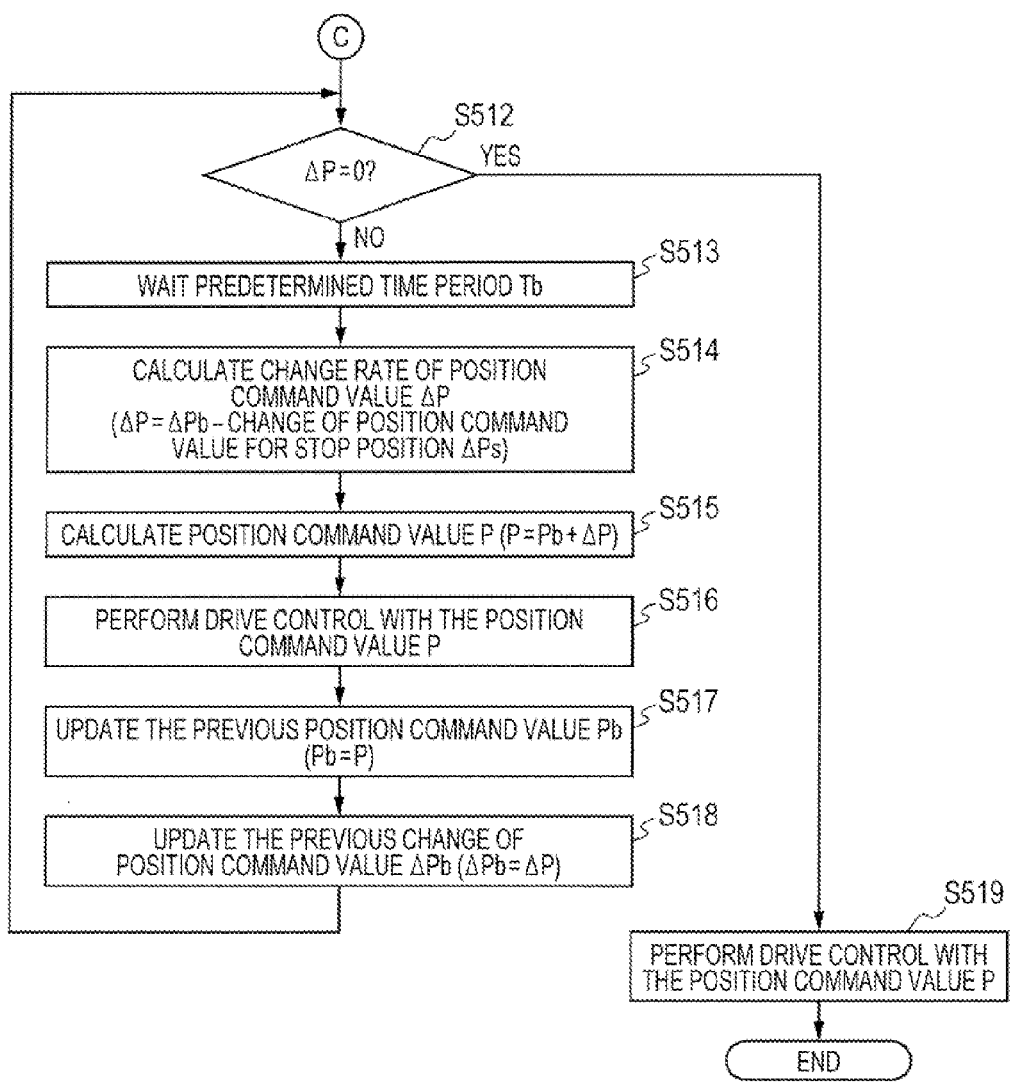
FIG. 14, which is composed of FIGS. 14A and 14B, is a flowchart of a position command value calculation process after the wireless communication stop.

FIGS. 14A and 14B are flowcharts of a process of determining the position command value after the communication stop.

After the start, in Step S501, the time $T_0$ at which the communication stop has occurred is stored, and the process flow proceeds to Step S502.

In Step S502, a position command value $P_i$ received immediately before the communication stop is set to a latest position command value $P_b$, and the process flow proceeds to Step S503.

In Step S503, the position command value variation amount $\Delta P_i$ during the predetermined time period $T_b$ immediately before the communication stop is set to the latest position command value variation amount $\Delta P_b$, and the process flow proceeds to Step S504.

In Step S504, a value calculated by using the equation (2) is set to the position command value variation rate ΔV, and the process flow proceeds to Step S505.

In Step S505, a value of the latest position command value variation amount $\Delta P_b$ plus the position command value variation rate ΔV is set to the position command value variation amount ΔP, and the process flow proceeds to Step S506.

In Step S506, a value of the latest position command value $P_b$ plus the position command value variation amount ΔP is set to the position command value P, and the process flow proceeds to Step S507.

In Step S507, position control of the drive target is performed in accordance with the position command value P, and the process flow proceeds to Step S508.

In Step S508, it is determined whether or not the predetermined time period $T_w$ has elapsed after the time $T_0$ at which the communication stop occurred. When the time period $T_w$ has not elapsed, the process flow proceeds to Step S509. Otherwise, the process flow proceeds to Step S512.

In Step S509, the latest position command value $P_b$ is updated to the position command value P, and the process flow proceeds to Step S510.

In Step S510, the latest position command value variation amount $\Delta P_b$ is updated to the position command value variation amount ΔP, and the process flow proceeds to Step S511.

In Step S511, the CPU waits for an elapse of the predetermined time period $T_b$, and the process flow returns to Step S505.

In Step S512, it is determined whether or not the position command value variation amount ΔP is zero (whether or not the stopped state is commanded). When the position command value variation amount ΔP is zero (when the stopped state is commanded), the process flow proceeds to Step S513. Otherwise (when movement is commanded), the process flow proceeds to Step S519.

In Step S513, the CPU waits for an elapse of the predetermined time period $T_b$, and the process flow proceeds to Step S514.

In Step S514, a value of $\Delta P_b - \Delta P_s$ is set to the position command value variation amount ΔP, and the process flow proceeds to Step S515. Here, when $\Delta P_s$ is larger than $\Delta P_b$, ΔP is set to zero.

In Step S515, a value of $P_b + \Delta P$ is set to the position command value P, and the process flow proceeds to Step S516.

In Step S516, position control of the drive target is performed in accordance with the position command value P, and the process flow proceeds to Step S517.

In Step S517, the latest position command value $P_b$ is updated to the position command value P, and the process flow proceeds to Step S518.

In Step S518, the latest position command value variation amount $\Delta P_b$ is updated to the position command value variation amount ΔP, and the process flow returns to Step S512.

In Step S519, position control of the drive target is performed in accordance with the position command value P, and the process is finished.

Here, ΔV is determined from a difference between the position command value variation amount $\Delta P_i$ immediately before the communication stop and the position command value variation $\Delta P_{i-1}$ at a time which is the time period $T_b$ before communication stop, but it is possible to adopt another calculation method such as multiplying the two values.

As described above, using a unit for detecting a variation with time (timeline variation) of the command signal, the variation with time of the command signal is analyzed so that the position command value $P_n$ after the communication stop is predicted, and the drive target is driven in accordance with this position command value $P_n$. Thus, even when the communication becomes the connected state again after the communication stop, smooth transition of the position command value can be performed. Further, when the communication is not restored to the connected state for a predetermined time period after the communication stop, the position command value is gradually stopped so that drive control without a feeling of strangeness can be performed.

The variation of the position command value after the communication stop is described above, but the same process is performed also in the case where the command value is the speed command value. In the case of the speed command value, drive control of the drive target is performed by using the position command value variation amount ΔP instead of the position command value P as the speed command value.

The exemplary embodiments of the present invention are described above, but the present invention is not limited to these embodiments and can be modified and changed variously within the scope of the spirit thereof.

Third Embodiment

In the following, referring to FIGS. 15, 16, and 17, a third embodiment of the present invention of a process method of generating a focus lens position command value by using a relative position command is described. Herein, an absolute position indicates a relative position of a given member with respect to the entire apparatus, and a relative position indicates a variation amount of the relative position.

Figure 15:
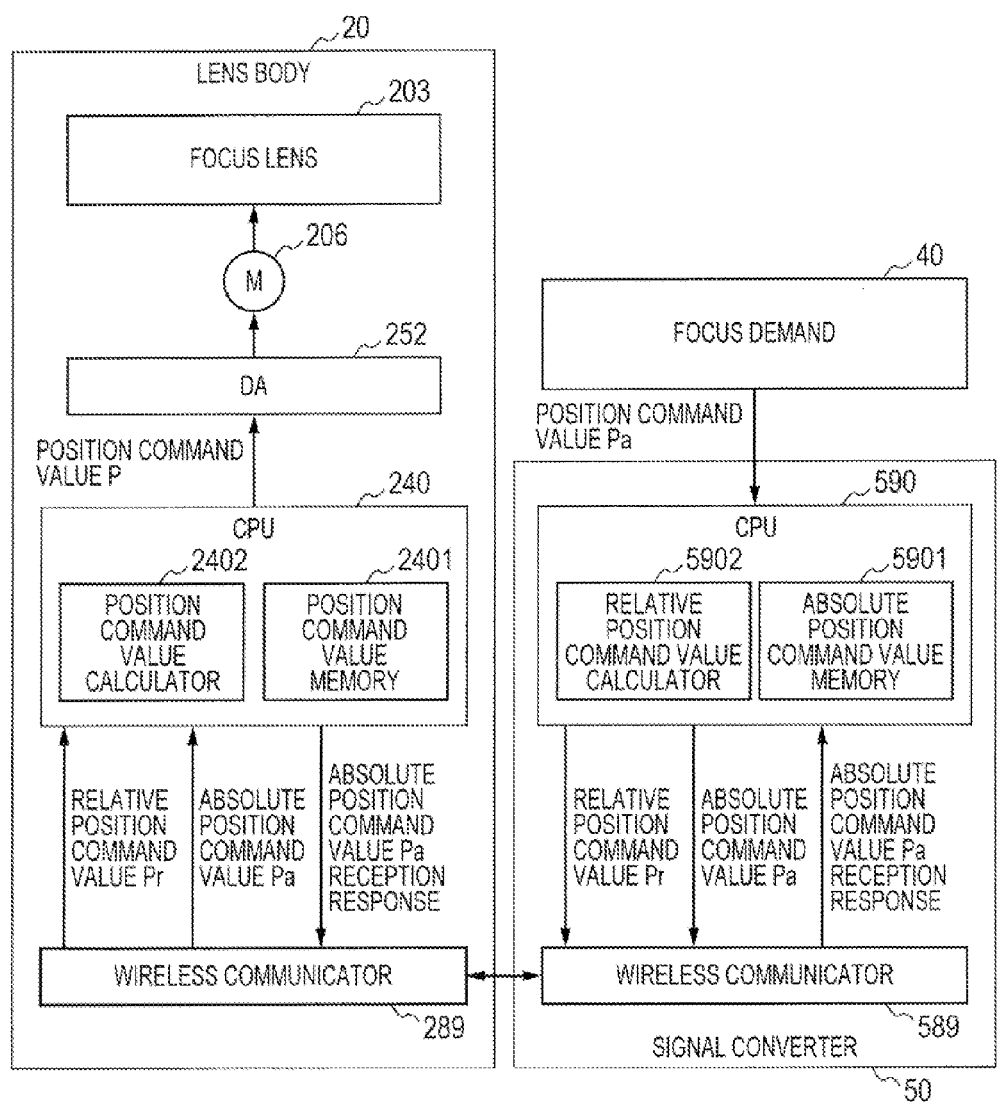
FIG. 15 is a circuit block diagram of a relative position command communication.

FIG. 15 illustrates a circuit block diagram of the third embodiment. The same function as the function illustrated in FIGS. 2 and 3 is denoted by the reference symbol, and overlapping description is omitted.

The CPU 590 of the signal converter 50 includes an absolute position command value memory 5901 and a relative position command calculator 5902 and is connected to the wireless communicator 589. The CPU 240 of the lens body 20 includes a position command value memory 2401 and a position command value calculator 2402 and is connected to the wireless communicator 289 and the D/A converter 252.

When an absolute position command value Pa is supplied from the focus demand 40 to the signal converter 50, the CPU 590 transmits the absolute position command value Pa to the CPU 240 of the lens body 20 via the wireless communicators 589 and 289.

In the lens body 20, the CPU 240 receives the absolute position command value Pa from the signal converter 50 and delivers the absolute position command value Pa as the position command value P to the D/A converter 252. In addition, the position command value P is stored as the latest position command value Pb in the position command value memory 2401. Further, an absolute position command value Pa reception response is transmitted to the CPU 590 of the signal converter 50 via the wireless communicators 289 and 589. When the CPU 590 of the signal converter 50 receives the absolute position command value Pa reception response from the lens body 20, the CPU 590 stores the absolute position command value Pa supplied from the focus demand 40 in the absolute position command value memory 5901 as the latest absolute position command value Pab.

When the position command value P is delivered from the CPU 240 to the D/A converter 252 in the lens body 20, drive control of the focus lens 203 is performed based on the position command value P by the same method as the first embodiment.

When the absolute position command value Pa is supplied from the focus demand 40 to the CPU 590 of the signal converter 50 after the CPU 590 receives the absolute position command value Pa reception response from the CPU 240 of the lens body 20, the CPU 590 delivers the position command to the lens body 20 as described below.

First, the CPU 590 calculates the relative position command value Pr in the relative position command calculator 5902 based on the latest absolute position command value Pab stored in the absolute position command value memory 5901 and the latest absolute position command value Pa. The relative position command value Pr is transmitted to the CPU 240 of the lens body 20 via the wireless communicators 589 and 289. When the CPU 240 of the lens body 20 receives the relative position command value Pr, the CPU 240 calculates the position command value P in the position command value calculator 2402 based on the relative position command value Pr and the latest position command value Pb stored in the position command value memory 2401. When the position command value calculator 2402 calculates the position command value P, the CPU 240 delivers the position command value P to the D/A converter 252. In addition, the position command value P is stored as the latest position command value Pb in the position command value memory 2401.

When the position command value P is output, the D/A converter 252 drives and controls the focus lens 203 based on the position command value P by the same method as the first embodiment.

Next, the process method in the CPU 590 of the signal converter 50 in the third embodiment is described. FIG. 16 is a flowchart of the process performed in the CPU 590 of the signal converter 50 in the third embodiment.

After the start, in Step S601, a request to connect to the lens body 20 is issued to the wireless communicator 589 so that the wireless connection to the lens body 20 is started, and the process flow proceeds to Step S602.

In Step S602, the wireless connection state to the lens body 20 is checked, and the process of Step S602 is continued until the wireless connection state becomes the connected state. When the wireless connection state to the lens body 20 is confirmed, the process flow proceeds to Step S603.

In Step S603, the absolute position command value Pa is obtained from the focus demand 40, and the process flow proceeds to Step S604.

In Step S604, the absolute position command value Pa is transmitted to the lens body 20 via the wireless communicator 589, and the process flow proceeds to Step S605.

In Step S605, in order to receive the absolute position command value Pa reception response from the lens body 20, the CPU 590 waits for a predetermined time period, and the process flow proceeds to Step S606.

In Step S606, it is checked whether or not the absolute position command value Pa reception response is received from the lens body 20. When the absolute position command value Pa reception response is not received, the process flow returns to Step S603. When the absolute position command value Pa reception response is received, the process flow proceeds to Step S607. In this case, when the lens body 20 receives the absolute position command value Pa from the signal converter 50, the lens body 20 transmits the absolute position command value Pa reception response to the signal converter 50. Therefore, when the absolute position command value Pa reception response is received by the signal converter 50, the absolute position command value Pa is synchronized between the lens body 20 and the signal converter 50.

In Step S607, the CPU 590 sets a synchronized time Tdc of the absolute position command value Pa to the current time, and the process flow proceeds to Step S608. In this case, the synchronized time Tdc of the absolute position command value Pa indicates a time at which the absolute position command value Pa is synchronized between the lens body 20 and the signal converter 50.

In Step S608, the absolute position command value Pa transmitted to the lens body 20 is stored as the latest absolute position command value Pab, and the process flow proceeds to Step S609.

In Step S609, the absolute position command value Pa is obtained from the focus demand 40, and the process flow proceeds to Step S610.

In Step S610, the relative position command calculator 5902 calculates a difference between the absolute position command value Pa obtained from the focus demand 40 in Step S609 and the latest absolute position command value Pab as the relative position command value Pr, and the process flow proceeds to Step S611.

In Step S611, the CPU 590 transmits the relative position command value Pr to the lens body 20 via the wireless communicator 589, and the process flow proceeds to Step S612.

In Step S612, the absolute position command value Pa obtained from the focus demand 40 in Step S609 is stored as the latest absolute position command value Pab, and the process flow proceeds to Step S613.

In Step S613, it is determined whether or not a predetermined time period has elapsed from the synchronized time Tdc of the absolute position command value Pa. When the predetermined time period has elapsed from the synchronized time Tdc of the absolute position command value Pa, it is determined that the synchronization with the lens body 20 is necessary, and the process flow returns to Step S603. Otherwise, the process flow proceeds to Step S614.

In Step S614, the wireless communication connection state between the wireless communicator 589 and the lens body 20 is checked. When the communication connection state is the connected state, the process flow returns to Step S609. Otherwise, the process flow returns to Step S601.

Next, the process method in the CPU 240 of the lens body 20 according to the third embodiment is described.

Figure 17:
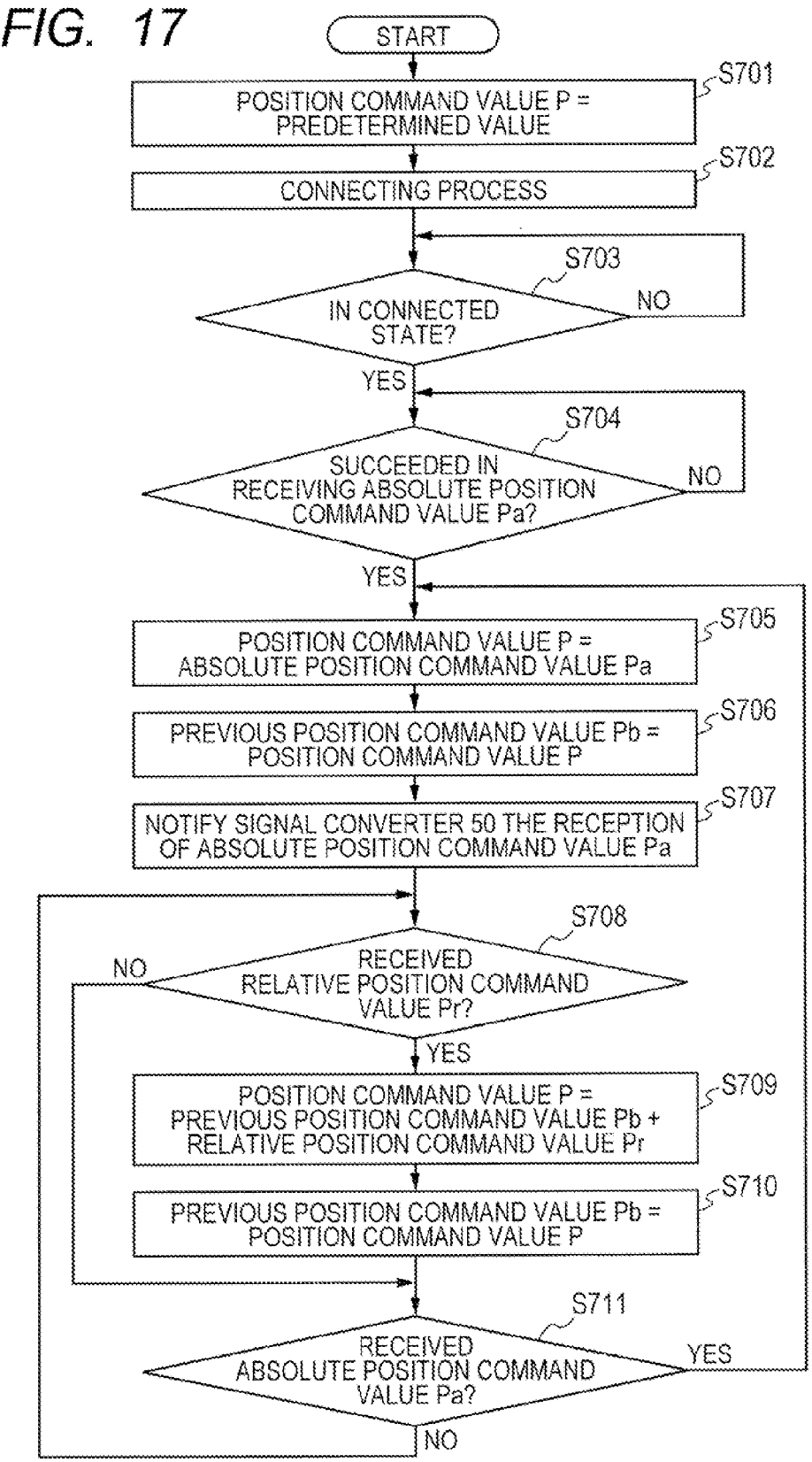
FIG. 17 is a process flowchart of the relative position command communication in a lens body.

FIG. 17 is a flowchart of the process performed in the CPU 240 of the lens body 20 according to the third embodiment.

After the start, in Step S701, a predetermined value is set to the position command value P, drive control of the focus lens 203 is performed based on this position command value P, and the process flow proceeds to Step S702.

In Step S702, request to connect to the signal converter 50 is issued to the wireless communicator 289, wireless connection to the signal converter 50 is started, and the process flow proceeds to Step S703.

In Step S703, the wireless connection state to the signal converter 50 is checked, and the process of Step S703 is continued until the wireless connection state becomes the connected state. When the wireless connected state to the signal converter 50 is confirmed, the process flow proceeds to Step S704.

In Step S704, it is checked whether or not the absolute position command value Pa transmitted from the signal converter 50 is received, and the process of Step S704 is continued until the absolute position command value Pa is received. When the absolute position command value Pa is received, the process flow proceeds to Step S705.

In Step S705, the received absolute position command value Pa is set to the position command value P, drive control of the focus lens 203 is performed based on this position command value P, and the process flow proceeds to Step S706.

In Step S706, the position command value memory 2401 stores the position command value P as the latest position command value Pb, and the process flow proceeds to Step S707.

In Step S707, the absolute position command value Pa reception response is transmitted to the signal converter 50 via the wireless communicator 289, and the process flow proceeds to Step S708.

In Step S708, it is checked whether or not the relative position command signal Pr is received from the signal converter 50. When the relative position command signal Pr is received, the process flow proceeds to Step S709. Otherwise, the process flow proceeds to Step S711.

In Step S709, the position command value calculator 2402 sets a sum value of the latest position command value Pb and the relative position command signal Pr whose reception is checked in Step S708 to the position command value P, the CPU 240 performs drive control of the focus lens 203 based on the position command value P, and the process flow proceeds to Step S710.

In Step S710, the position command value P calculated in Step S709 is set to the latest position command value Pb, and the process flow proceeds to Step S711.

In Step S711, it is checked whether or not the absolute position command signal Pa is received from the signal converter 50. When the absolute position command signal Pa is received, the process flow returns to Step S705. Otherwise, the process flow proceeds to Step S708.

Figure 16:
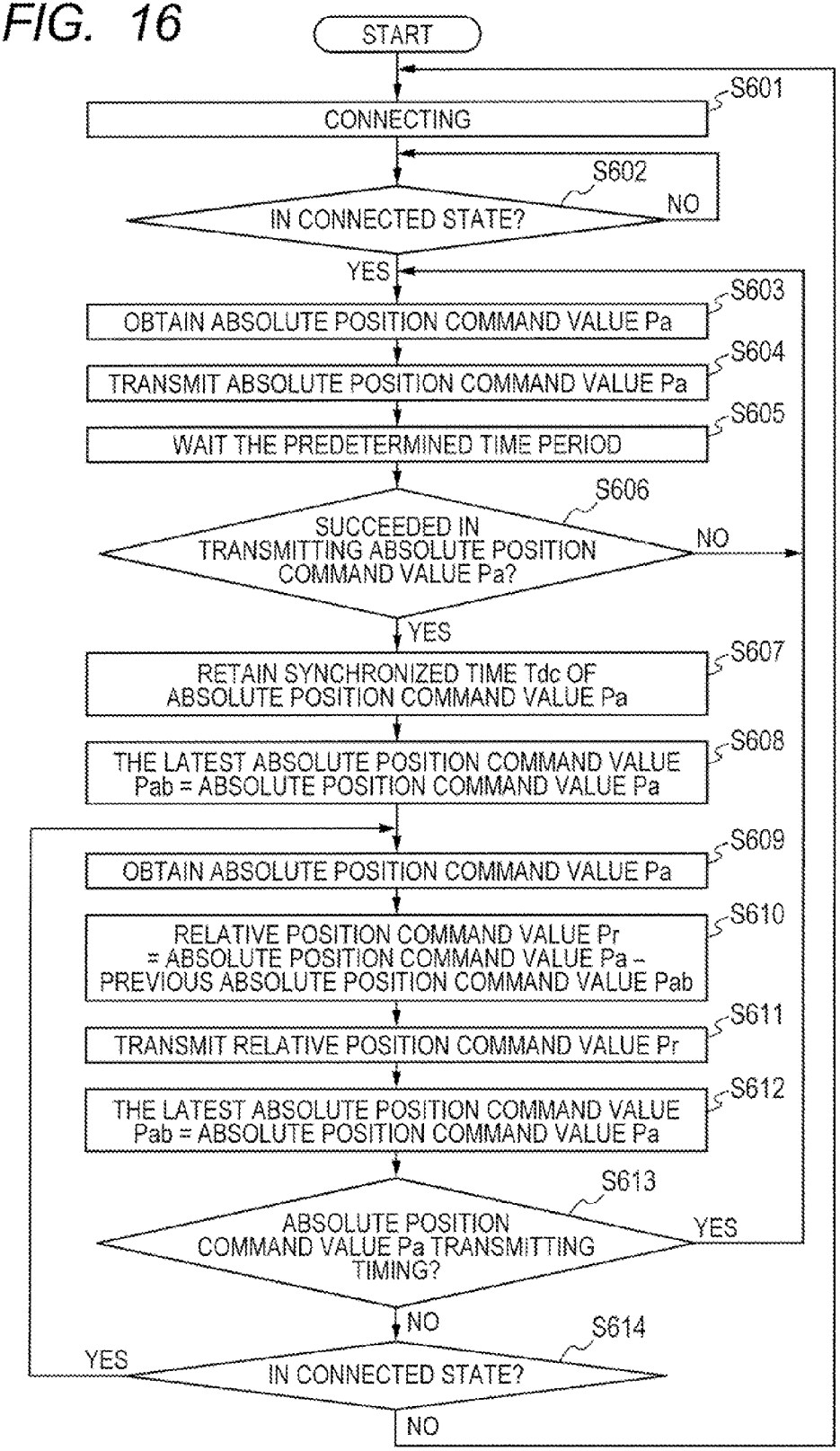
FIG. 16 is a flowchart of a signal converter process of the relative position command communication.
Figure 18:
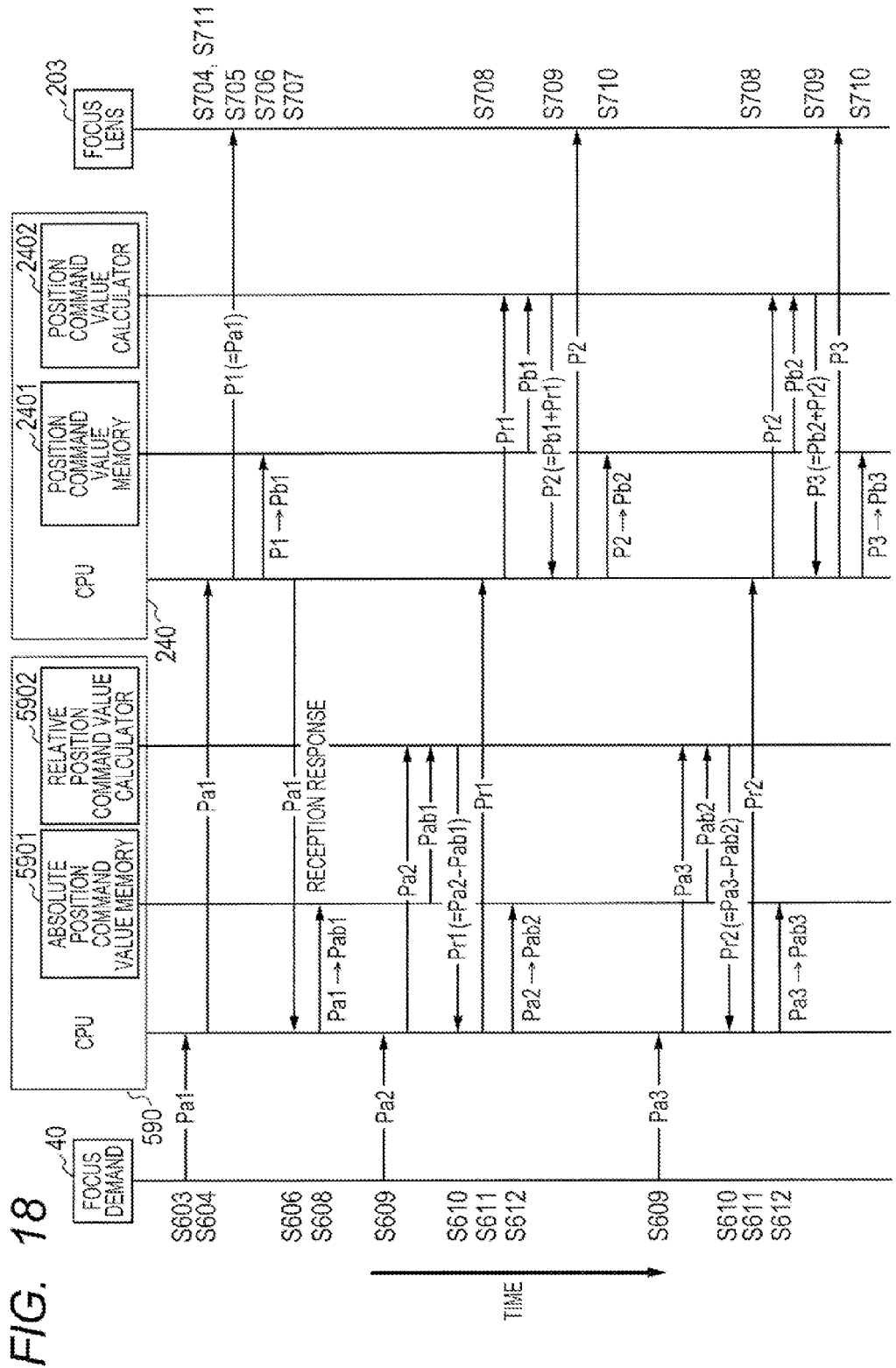
FIG. 18 is a process flowchart of the relative position command communication between a signal converter and the lens body.

FIGS. 16 and 17 illustrate flowcharts of the processes of the CPU 590 of the signal converter 50 and the CPU 240 of the lens body 20, and FIG. 18 illustrates a signal transmission and reception relationship among the focus demand 40, the signal converter 50, and the lens body 20. The same number as the process step in FIGS. 16 and 17 is indicated in FIG. 18.

In the example illustrated in FIG. 18, the CPU 590 receives an absolute position command value Pa1 from the focus demand 40, and receives an absolute position command value Pa1 reception response after the focus lens 203 is driven in response to the absolute position command value Pa1. After that, the absolute position command value memory 5901 stores the absolute position command value Pa1 as the latest absolute position command value Pab1, and the absolute position command value Pa1 is synchronized between the signal converter 50 and the lens body 20. After that, when the CPU 590 receives a new absolute position command value Pa2 from the focus demand 40, the absolute position command value Pa2 is not delivered as the command value from the CPU 590 to the CPU 240. A relative position command value Pr1 with reference to the latest absolute position command Pa1 is output.

After that, when the CPU 590 receives a new absolute position command value Pa3 from the focus demand 40, the same process is performed. At this time, the predetermined time period has not elapsed from the synchronized time Tdc of the absolute position command value Pa at which the CPU 590 received the absolute position command value Pa1 reception response from the CPU 240. Therefore, when the absolute position command values Pa2 and Pa3 are received from the focus demand 40 in FIG. 18, the command values are output as the relative position command values Rr1 and Pr2. When the predetermined time period has elapsed from the synchronized time Tdc of the absolute position command value Pa at the time when the absolute position command values Pa2 and Pa3 are received from the focus demand 40, the absolute position command value is synchronized again by the process from Step S603 to Step S608.

Through the above-mentioned process, the lens body 20 updates the position command value P when receiving the absolute position command signal Pa, and otherwise controls the drive target based on the absolute position command signal Pa and the relative position command signal Pr received in the past. Therefore, when communication stop of the wireless communication occurs, it is not necessary to perform a special process in the lens body 20 until the communication is recovered so that a new absolute position command signal Pa is received from the focus demand 40. It is possible to control the position of the focus lens 203 to be the position of the position command signal received last time from the signal converter. In other words, the same latest position command value is used as a reference position for the next drive command in the signal converter 50 on a focus demand side and on a lens body side. Therefore, even when the communication between the signal converter 50 and the lens body becomes the disconnected state, the relative position command with respect to the reference position is zero until a new absolute position command signal is input. Therefore, the state when the communication is disconnected is stably maintained without an unnatural operation that is not intended by an operator.

As described above, in the description of the embodiments, the focus lens 203 is exemplified as the movable optical member. As other movable optical members, there are a stop, a zoom lens, an extender lens, an image stabilizer, a flange back adjustment macro lens, and the like. When command control of these members is performed, the same effect can also be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-130583, filed on Jun. 8, 2012, which is hereby incorporated by reference herein in its entirety.

What is claimed is:

1. A lens system comprising:
a lens apparatus including a movable optical member;
a command generating apparatus that generates a command signal to be transmitted to the movable optical member;
a signal converter connected to the command generating apparatus by wire and communicable to and from the lens apparatus wirelessly;
  a drive controller that controls drive of the movable optical member based on the command signal; and
  a wireless communicator that performs wireless communication to and from the signal converter,
wherein the drive controller detects a condition of the wireless communication between the wireless communicator and the signal converter and then controls driving of the movable optical member based on a command value when the wireless communication between the wireless communicator and the signal converter is stopped, and
wherein the command value is a first command value upon a first stop condition due to an operation of a user and is a second command value different from the first command value upon a second stop condition different from the first stop condition.

2. The lens system according to claim 1, wherein:
the lens apparatus comprises a memory that stores the command signal from the command generating apparatus, and
the drive controller determines the command value so that the movable optical member moves to a predetermined initial position upon the first stop condition, determines the command value based on a stored latest command signal upon the second stop condition, and then controls driving of the movable optical member.

3. The lens system according to claim 2, wherein:
the lens apparatus further comprises a calculator that calculates a timeline variation of the command signal, and
the drive controller drives and controls the movable optical member based on the stored latest command signal and the timeline variation of the command signal when the wireless communication is stopped due to the second stop condition.

4. The lens system according to claim 2, wherein:
the memory of the lens apparatus stores an absolute position command signal from the command generating apparatus,
the drive controller generates a position command signal for driving the movable optical member based on a reference position as an absolute position of the movable optical member and a relative position command value indicating a relative position of the movable optical member with respect to the reference position, and
when the wireless communication is stopped due to the second stop condition, the drive controller drives and controls the movable optical member based on a generated latest command signal.

5. The lens system according to claim 1, wherein:
the drive controller comprises a unit for detecting a radio field intensity of the wireless communication, and
the second stop condition comprises a case where the wireless communication is stopped after a variation amount of the radio field intensity of the wireless communication per unit time decreases at a constant rate or lower.

6. The lens system according to claim 1, wherein:
the drive controller comprises a unit for monitoring a power supply voltage of the signal converter, which is transmitted from the signal converter, and
the second stop condition comprises a case where the wireless communication is stopped after the power supply voltage of the signal converter, which is monitored by the drive controller, becomes a predetermined voltage or lower.

7. The lens system according to claim 1, wherein the second stop condition comprises a case where the wireless communication is stopped after an increase of a total intensity of a communication band signal received by the wireless communicator of the lens apparatus.

8. A lens system comprising:
a lens apparatus including a movable optical member;
a command generating apparatus that generates a command signal to be transmitted to the movable optical member;
a signal converter connected to the command generating apparatus by wire and communicable to and from the lens apparatus wirelessly;
a memory that stores the command signal from the command generating apparatus,
wherein the lens apparatus comprises:
  a drive controller that controls drive of the movable optical member based on the command signal;
  a wireless communicator that performs wireless communication to and from the signal converter;
  a memory that stores the command signal from the command generating apparatus; and
  a calculator that calculates a timeline variation of the command signal,
wherein the command signal comprises a position command signal to command a position to which the movable optical member is to be driven,
wherein when the wireless communication is stopped due to a predetermined cause, the drive controller drives and controls the movable optical member based on a stored latest position command signal, a speed obtained from a timeline variation of the position command signal, and a variation amount of the speed, wherein the predetermined cause comprises a case where the wireless communication is stopped due to a cause where the position command signal is changing, and wherein when a predetermined time period elapses under a state where the wireless communication is stopped due to the predetermined cause, the drive controller sets a position command signal every predetermined time period based on the stored latest position command signal and a speed smaller than a stored latest speed by a predetermined value, and drives and controls the movable optical member until the movable optical member stops.

9. An image pickup system comprising:

a lens system comprising:

a lens apparatus including a movable optical member;

a command generating apparatus that generates a command signal to be transmitted to the movable optical member;

a signal converter connected to the command generating apparatus by wire and communicable to and from the lens apparatus wirelessly;

a drive controller that controls drive of the movable optical member based on the command signal; and a wireless communicator that performs wireless communication to and from the signal converter, wherein the drive controller detects a condition of the wireless communication between the wireless communicator and the signal converter and then controls driving of the movable optical member based on a command value when the wireless communication between the wireless communicator and the signal converter is stopped, and wherein the command value is a first command value upon a first stop condition due to an operation of a user and is a second command value different from the first command value upon a second stop condition different from the first stop condition; and an image pickup apparatus including an image pickup element that takes an object image formed by the lens system.

10. A drive control method for a movable optical member of a lens system, the lens system comprising:

a lens apparatus including a movable optical member;

a command generating apparatus that generates a command signal to be transmitted to the movable optical member;

a signal converter connected to the command generating apparatus by wire and communicable to and from the lens apparatus wirelessly;

a drive controller that controls drive of the movable optical member based on the command signal; and a wireless communicator that performs wireless communication to and from the signal converter, wherein the drive controller detects a condition of the wireless communication between the wireless communicator and the signal converter and then controls driving of the movable optical member based on a command value when the wireless communication between the wireless communicator and the signal converter is stopped, wherein the command value is a first command value upon a first stop condition due to an operation of a user and is a second command value different from the first command value upon a second stop condition different from the first stop condition, wherein the drive control method comprises the steps of:

storing, with each of the signal converter and the lens apparatus, an absolute position command signal of the movable optical member from the command generating apparatus every predetermined time period as an absolute position command value;

after the absolute position command value is stored, transmitting, with the signal converter to the lens apparatus as a relative position command value, a relative position of the movable optical member with respect to the absolute position command value of the absolute position command signal from the command generating apparatus, generating, with the lens apparatus, a position command signal based on the relative position command value received from the signal converter and the stored absolute position command value, and driving and controlling, with the lens apparatus, the movable optical member based on the position command signal; and driving and controlling, with the lens apparatus, the movable optical member based on a generated latest command signal when the wireless communication between the signal converter and the lens apparatus is stopped.

* * * * *